(12) United States Patent
Cho et al.

(10) Patent No.: US 12,039,439 B2
(45) Date of Patent: *Jul. 16, 2024

(54) ISA-BASED COMPRESSION IN DISTRIBUTED TRAINING OF NEURAL NETWORKS

(71) Applicant: International Business Machines Corporation, Armonk, NY (US)

(72) Inventors: Minsik Cho, Austin, TX (US); Ulrich A. Finkler, Mahopac, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 850 days.

This patent is subject to a terminal disclaimer.

(21) Appl. No.: 17/129,038

(22) Filed: Dec. 21, 2020

(65) Prior Publication Data

US 2021/0150351 A1 May 20, 2021

Related U.S. Application Data

(63) Continuation of application No. 15/709,955, filed on Sep. 20, 2017, now Pat. No. 10,977,552.

(51) Int. Cl.
*G06N 3/08* (2023.01)
*G06F 9/30* (2018.01)
*G06F 9/46* (2006.01)
*G06N 3/045* (2023.01)

(52) U.S. Cl.
CPC ............. *G06N 3/08* (2013.01); *G06F 9/30* (2013.01); *G06F 9/46* (2013.01); *G06N 3/045* (2023.01)

(58) Field of Classification Search
CPC .. G06N 3/08; G06N 3/045; G06F 9/30; G06F 9/46
USPC ......................................................... 706/25
See application file for complete search history.

(56) References Cited

U.S. PATENT DOCUMENTS

2017/0097970 A1* 4/2017 Bendel ................. G06F 16/254
2020/0159534 A1* 5/2020 Li ......................... G06F 9/3016

OTHER PUBLICATIONS

Milova et al., "Speedup of deep neural network learning on the MIC-architecture", HPCS 2016 (Year: 2016).*

(Continued)

*Primary Examiner* — Tsu-Chang Lee
(74) *Attorney, Agent, or Firm* — Garg Law Firm, PLLC; Rakesh Garg; Yuanmin Cai

(57) ABSTRACT

An overall gradient vector is computed at a server from a set of ISA vectors corresponding to a set of worker machines. An ISA vector of a worker machine including ISA instructions corresponding to a set of gradients, each gradient corresponding to a weight of a node of a neural network being distributedly trained in the worker machine. A set of register values is optimized for use in an approximation computation with an opcode to produce an x-th approximate gradient of an x-th gradient. A server ISA vector is constructed in which a server ISA instruction in an x-th position corresponds to the x-th gradient in the overall gradient vector. A processor at the worker machine is caused to update a set of weights of the neural network, using the set of optimized register values and the server ISA vector, thereby completing one iteration of training.

20 Claims, 20 Drawing Sheets

(56) References Cited

OTHER PUBLICATIONS

2000 Proceedings of IEEE International Conference on Application-Specific Systems, Architectures, and Processor, 2000 (Year: 2000).*
List of all IBM related dockets, 2020.

* cited by examiner

[G+] ΔP1+, ΔP2+, ..., ΔPn+ + OLD [P] OLD P1, OLD P2, ..., OLD Pn = NEW [P] NEW P1, NEW P2, ..., NEW Pn ⇒ ITERATIVELY TRAINED DNN

1000

ISA-BASED COMPRESSION IN DISTRIBUTED TRAINING OF NEURAL NETWORKS

TECHNICAL FIELD

The present invention relates generally to a method, system, and computer program product for training a neural network. More particularly, the present invention relates to a method, system, and computer program product for ISA-based compression in distributed training of neural networks.

BACKGROUND

An Artificial Neural Network (ANN)—also referred to simply as a neural network—is a computing system made up of a number of simple, highly interconnected processing elements (nodes), which process information by their dynamic state response to external inputs. ANNs are processing devices (algorithms and/or hardware) that are loosely modeled after the neuronal structure of the mammalian cerebral cortex but on much smaller scales. A large ANN might have tens of thousands or even millions of processor units, whereas a mammalian brain has billions of neurons with a corresponding increase in magnitude of their overall interaction and emergent behavior.

A deep neural network (DNN) is a type of ANN with multiple hidden layers of units between the input and output layers. DNNs can model complex non-linear relationships. DNN architectures, e.g., for object detection and parsing, generate compositional models where the object is expressed as a layered composition of image primitives. The extra layers enable composition of features from lower layers, giving the potential of modeling complex data with fewer units than a similarly performing shallow network. Hereinafter, any reference to a DNN is only a non-limiting reference to an example type of neural network, unless expressly distinguished where used.

A neural network of any kind, including but not limited to DNNs, typically assigns a weight to a processing node. It is easy to have millions of weights assigned to millions of nodes in this manner. Training a neural network involves adjusting these weights such that for a given training input, the neural network produces a desired output as a result of the applied weights to the nodes. During a training iteration of a neural network, a training input is applied to a configuration of weighted nodes, an output is produced, and the weights are adjusted to adjust the output towards a desired output. The training progresses to the next iteration with the changed weights.

The change in the weight of a node in a neural network is called a gradient. A gradient vector is a set of gradients produced in an iteration of training. The number of gradients in a gradient vector (G) corresponds to the number of nodes in the neural network. Therefore, it is easy to have millions of gradients corresponding to the millions of nodes in a given neural network.

One method of training a neural network is to deploy the neural network (model), e.g., an implementation of a DNN, in several data processing systems (machines, workers, or worker machines). Different models receive the same or different training inputs at their respective machines. Accordingly, the training of the model can be expedited by distributing the training data set across multiple machines, where different instances of the same model are trained on different training data inputs.

SUMMARY

The illustrative embodiments provide a method, system, and computer program product. An embodiment includes a method that computes, using a processor and a memory at a parameter server, an overall gradient vector from a set of ISA vectors corresponding to a set of worker machines, a first ISA vector of a first worker machine comprising a first set of ISA instructions corresponding to a first set of gradients, each gradient in the first set of gradients corresponding to a weight of a node of a first neural network instance being distributedly trained in the first worker machine. The embodiment optimizes a set of register values such that when an optimized register value in the set of optimized register values is used in an approximation computation with an opcode from a set of opcodes the approximation computation produces an x-th approximate gradient that is within a tolerance value of an actual value of an x-th gradient in the overall gradient vector. The embodiment constructs a server ISA vector, wherein in the server ISA vector, a server ISA instruction in an x-th position in the server ISA vector corresponds to the x-th gradient in the overall gradient vector. The embodiment causes a processor and a memory at the first worker machine to update a set of weights of a set of nodes of the first neural network instance being distributedly trained in the first worker machine, the set of weights being updated using the set of optimized register values and the server ISA vector, wherein updating the set of weights completes one iteration of distributed training of the first neural network instance and forms an iteration-trained first neural network instance.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 10B depicts another step in one example manner of computing an overall gradient vector in accordance with an illustrative embodiment;

DETAILED DESCRIPTION

Figure 1:
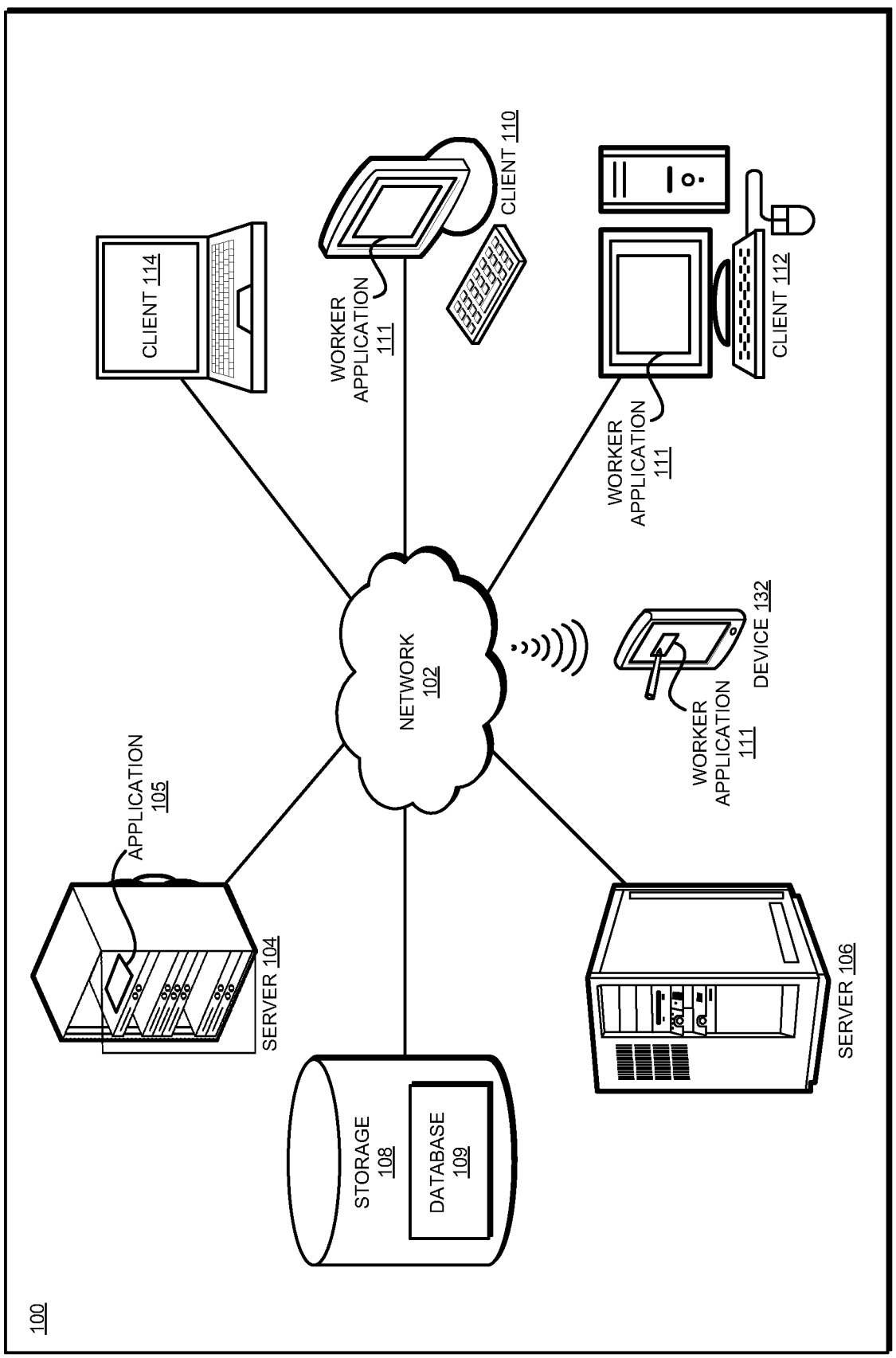
FIG. 1 depicts a block diagram of a network of data processing systems in which illustrative embodiments may be implemented.

The illustrative embodiments recognize that a distributed method of training a model produces different gradient vectors from different worker machines. Because the models often involve a large number of nodes and weights, the resulting gradient vectors include a corresponding large number of values.

In a distributed training system for neural networks, the worker machines transmit their gradient vectors to a parameter server (server). The server computes an overall gradient vector from the several gradient vectors that are received from the several worker machines at each iteration. The server then passes the overall gradient vector to each worker machine. Each worker machine then applies the overall gradient vector that is received from the server to their respective models and perform the next iteration of the training.

The illustrative embodiments recognize that this manner of distributed training of neural networks causes a significant amount of data transfer to occur between the set of worker machines and the server. Each gradient value in a gradient vector can be several bytes long. In the present implementations, typically but not necessarily, a gradient is represented in four bytes or 32 bits of data. A single gradient vector from a single worker machine for a single iteration of training an example model of one million nodes will at least be four million bytes of data, not counting any transmission overheads. If ten worker machines are used in the training, forty million bytes flow from the worker machines to the server, and the server provides four million bytes of the overall gradient vector to each of the worker machines, causing another forty million bytes of data flow, for a total of eighty million bytes of data flow in each iteration.

A distributed training session can comprise hundreds or even thousands of iterations. The significant volume of data transfer that can transpire over a data network as a result can lead to congestion, latency, and other adverse effects on the data network. A solution is therefore needed to reduce the amount of data being transferred between the worker machines and the server in a distributed training session of a neural network.

The illustrative embodiments recognize that the presently available tools or solutions do not address these needs or provide adequate solutions for these needs. The illustrative embodiments used to describe the invention generally address and solve the above-described problems and other related problems by ISA-based compression in distributed training of neural networks.

An embodiment can be implemented as a software application. The application implementing an embodiment, or one or more components thereof, can be configured as a modification of an existing neural network training system—i.e., a native application in a parameter server and a worker machine of such a system, as an application executing in a data processing system communicating with a parameter server and a worker machine of such a training system over a local area network (LAN)—i.e., as a local application on the LAN, as an application executing in a data processing system communicating with a parameter server and each worker machine of such a training system over a wide area network (WAN)—i.e., as a remote application on the WAN, as a separate application that operates in conjunction with a parameter server and each worker machine of such a training system in other ways, a standalone application, or some combination thereof.

A numeric value can be approximated as an operation on another numeric value. For example, a gradient value of +0.53 can be approximated as an addition operation with a value 0.5 that is stored in a register, or a multiplication operation between a multiplication factor, e.g., 2, and a value of 0.2 stored in another register.

Furthermore, an operation can be a simple operation as addition, subtraction, multiplication, and division, or more complex operations such as a square-root, an addition followed by a multiplication, two multiplications followed by a subtraction, and so on. Generally, an operation can be a function that can be performed using a register value alone or in combination with an existing weight of a node in a neural network, to output a gradient that should be applied to the node to better conform an output of the neural network to an expected value in a future iteration as compared to an output in a present iteration.

An operation can be represented by an opcode. An opcode is a compact manner of referencing an operation. For example, in one embodiment, an opcode is an index into a set, collection, or library of operations or functions. In another embodiment, the opcode may be a pointer into a library of functions.

An opcode is represented in binary using some number of bits in a set of bytes. For example, a 2-bit opcode can reference four operations with binary indices 00, 01, 10, and 11. The set of available operations can be larger than the indices representable by the number of bits available for opcodes. For example, while only four operations can be referenced with 2-bit opcodes, the set of available operations may include more than four operations.

A register is a data storage space in memory, e.g. in a graphical processing card or unit (GPU). A register can hold a single value. A bank of registers can hold one value in each register of the bank, each register being accessible in the bank by using an index into the register bank. For example, index 0 refers to register 0—which is the first register in the bank, index 1 refers to register 1—which is the second register in the bank, and so on. Any number of registers can exist and hold values therein.

A register index is represented in binary using some number of bits in a set of bytes. For example, a 2-bit register index can reference four registers with binary indices 00, 01, 10, and 11. The set of available registers can be larger than the indices representable by the number of bits available for register index. For example, while only four registers can be referenced with a 2-bit index, the set of available registers may include more than four registers.

Instruction set architecture (ISA) is a manner of communicating instructions for computations. For example, a bytecode instruction set uses 1-byte opcodes followed by parameters for the operation referenced by the opcode.

An embodiment adapts ISA such that a given number of bytes can represent both—an opcode and a register index. For example, using a single byte, four bits can be used to represent opcodes and the remaining four bits can be used to reference a register index. Several variations of this embodiment are possible. For example, 1/2/6: where 1 byte is used to communicate an opcode in 2 bits and register index in the remaining 6 bits; 2/6/10: where 2 bytes are used to communicate an opcode in 6 bits and register index in the remaining 10 bits; p/x/y: where p number of bytes are used to communicate an opcode and a register index, and the opcode occupies the first x bits and register index the remaining y bits; p/d: where p number of bytes are used to communicate an opcode and a register index, and the opcode occupies the bits before delimiter d and register index the remaining bits after delimiter d; and many others.

It is not necessary that the opcode be represented first and the register index next. An implementation can easily adapt an embodiment to provide the register index in the first x bits and the opcode in the latter y bits without departing the scope of the illustrative embodiments.

An embodiment receives or determines the gradient values for a gradient vector. The embodiment transforms the gradient values into ISA values to configures an ISA vector corresponding to the gradient vector. An entry in the ISA vector comprises an opcode and a register index, which when used in a computation approximate at least one entry in the gradient vector. The opcode and the register index in the ISA vector entry can be used in a computation in the example manner described herein.

For example, assume that each worker machine has been initialized with a set of opcodes—0-3 (decimal), and a set of register values at register index 0-3 (decimal). An example ISA value of "00010011" (one-byte binary), where the high four bits represent the opcode and the low four bits represent the register index, indicates that the operation at index 1 in the set of operations (e.g., a subtraction operation) should be applied to the value at register index 3 in the set of register values to compute a number that will approximate a gradient in the gradient vector. Similarly, "00100011" indicates that the operation at index 2 in the set of operations (e.g., a multiplication operation) should be applied to the value at register index 3 in the set of register values and any configured multipliers for the operation, to compute a number that will approximate a gradient for that node in the gradient vector. Other instructions can similarly be constructed to cause computations that will generate an approximation of a gradient.

The transformation of a gradient to an ISA value is lossy—in that the ISA value is usable to compute at the server an approximate value of the gradient, not necessarily the exact value of the gradient as computed at the worker machine. The ISA value is constructed such that the approximation is within a tolerance value of the corresponding gradient.

An embodiment transforms each gradient in a gradient vector to an ISA value in an ISA vector. In some cases, an opcode might be configured to indicate operations such as "repeat" a previous operation, and other strategies for ISA compaction. For example, if five gradients for five weights are all similar (within a tolerance), a single ISA value corresponding to the first of the five common gradients can indicate an opcode and a register index, where the opcode references an operation and an instruction to repeat the operation x number of times (the number of remaining common gradient or weight values).

An embodiment advantageously transmits from a worker machine to the server an ISA vector instead of the prior-art gradient vector. For example, where a gradient would occupy four bytes in transmission, an ISA value occupies only one byte, yielding a compact data transmission as compared to the prior-art. Considering large gradient vectors from several worker machines, over several iterations, a training performed using an embodiment causes the transmission from the worker machines to the server to be significantly reduced.

An embodiment operating in the server receives a set of ISA vectors from a set of worker machines. The embodiment computes a worker machine's gradient vector corresponding to each received ISA vector. The embodiment computes an overall gradient vector using the worker machines' gradient vectors. For example, in one implementation the embodiment computes an average gradient vector from all the worker machine gradient vectors, i.e. by taking an average of the gradients at the same position in each worker machine gradient vector to form a gradient at the same position in the overall gradient vector. In another implementation, the embodiment applies a different statistical computation to the worker machine gradient vectors to compute the overall gradient vector. Another embodiment further applies (e.g., by multiplying) a factor (W) to the overall gradient vector to obtain a final overall gradient vector.

These examples of methods of computing the overall gradient vector from a set of worker machine gradient vectors are not intended to be limiting. From this disclosure, those of ordinary skill in the art will be able to conceive many other ways of computing the overall gradient vector from the set of worker machine gradient vectors, and the same are contemplated within the scope of the illustrative embodiments.

An embodiment operating in the server further revises the register values. For example, each worker machine used a common set of register values in computing their respective ISA vectors for that particular iteration of training. The embodiment on the server now revises that common set of register values for the next iteration of the training. Particularly, the embodiment determines a set of values that minimize the error or difference between each gradient value in the overall gradient vector and an ISA value representation thereof. For example, suppose that the set of register values used by the worker machines includes only three register values, and the set of used opcodes has four opcodes. The servers-side embodiment computes three revised values that when one of the register values is used with one of the four opcodes, the resulting computed gradient is an acceptable approximation of an actual gradient value in the overall gradient vector.

A server-side embodiment computes an ISA vector corresponding to the overall gradient vector computed on the server-side. The server-side embodiment transmits the server's ISA vector and the revised register values to the worker machines.

A worker machine-side embodiment receives the server's ISA vector and the revised register values. The worker machine-side embodiment updates the register values on the worker machine and computes an approximation of the overall gradient vector from the server's ISA vector. The worker machine-side embodiment applies the computed approximate gradients to the model at the worker machine for the next iteration of training the model.

The iterative distributed training can be stopped in any number of ways. For example, a server-side embodiment can be configured to detect that when the overall gradient vector shows that some or all gradients therein have changed less than a threshold change, the model can be considered as trained and the training can stop. Accordingly, the server-side embodiment can instruct a worker machine-side embodiment to not perform further iterations. A user-supplied instruction at the server and/or at a worker machine can also stop the training iterations.

Similarly, a worker machine-side embodiment can be configured to detect that when the local gradient vector shows that some or all gradients therein have changed less than a threshold change, the local model can be considered as trained and the training can stop at the worker machine. The worker machine-side embodiment can also optionally inform the server-side embodiment that the training at the particular worker machine should be considered as completed.

The manner of ISA-based compression in distributed training of neural networks described herein is unavailable in the presently available methods. A method of an embodiment described herein, when implemented to execute on a device or data processing system, comprises substantial advancement of the functionality of that device or data processing system in iterative distributed training of a neural network while significantly reducing the training-related data traffic between the various machines participating in the training.

The illustrative embodiments are described with respect to certain types of neural network configurations, weights, nodes, gradients, ISA instructions, opcodes, register values, gradient vectors, indices, bit-sizes, byte-sizes, delimiters, locations of embodiments, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
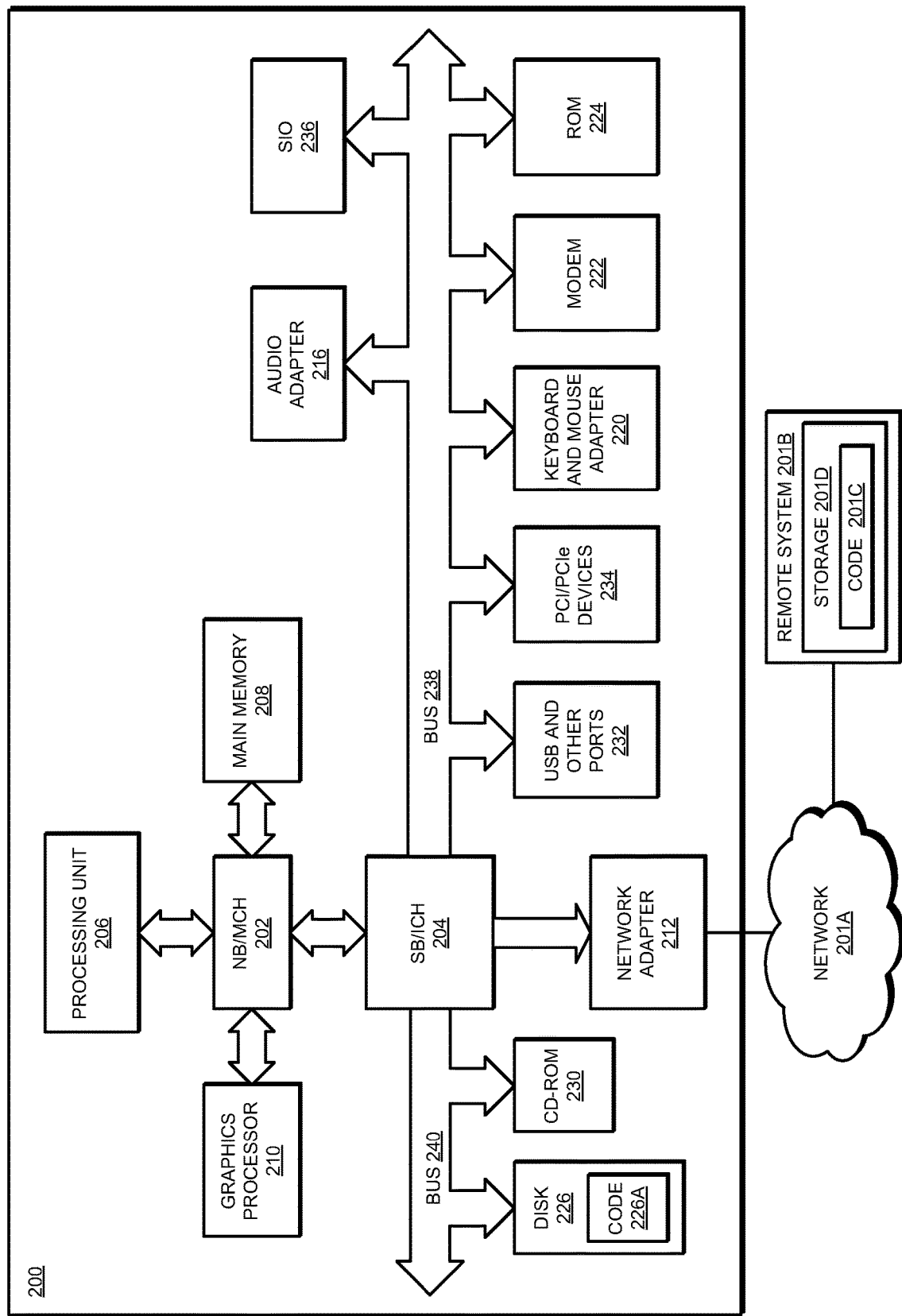
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Server 104 is a non-limiting example of a parameter server as described herein. A client machine, e.g., client 114 can also operate as a parameter server. Application 105 implements a server-side embodiment described herein. Clients 110, 112, and 132 are non-limiting examples of worker machines, any number and types of which can be used in a similar manner. Worker application 111 implements a worker machine-side embodiment described herein. Various instances of worker application 111 operate on worker machine 110, worker machine 112, and worker machine 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as applications 105 and/or 111 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
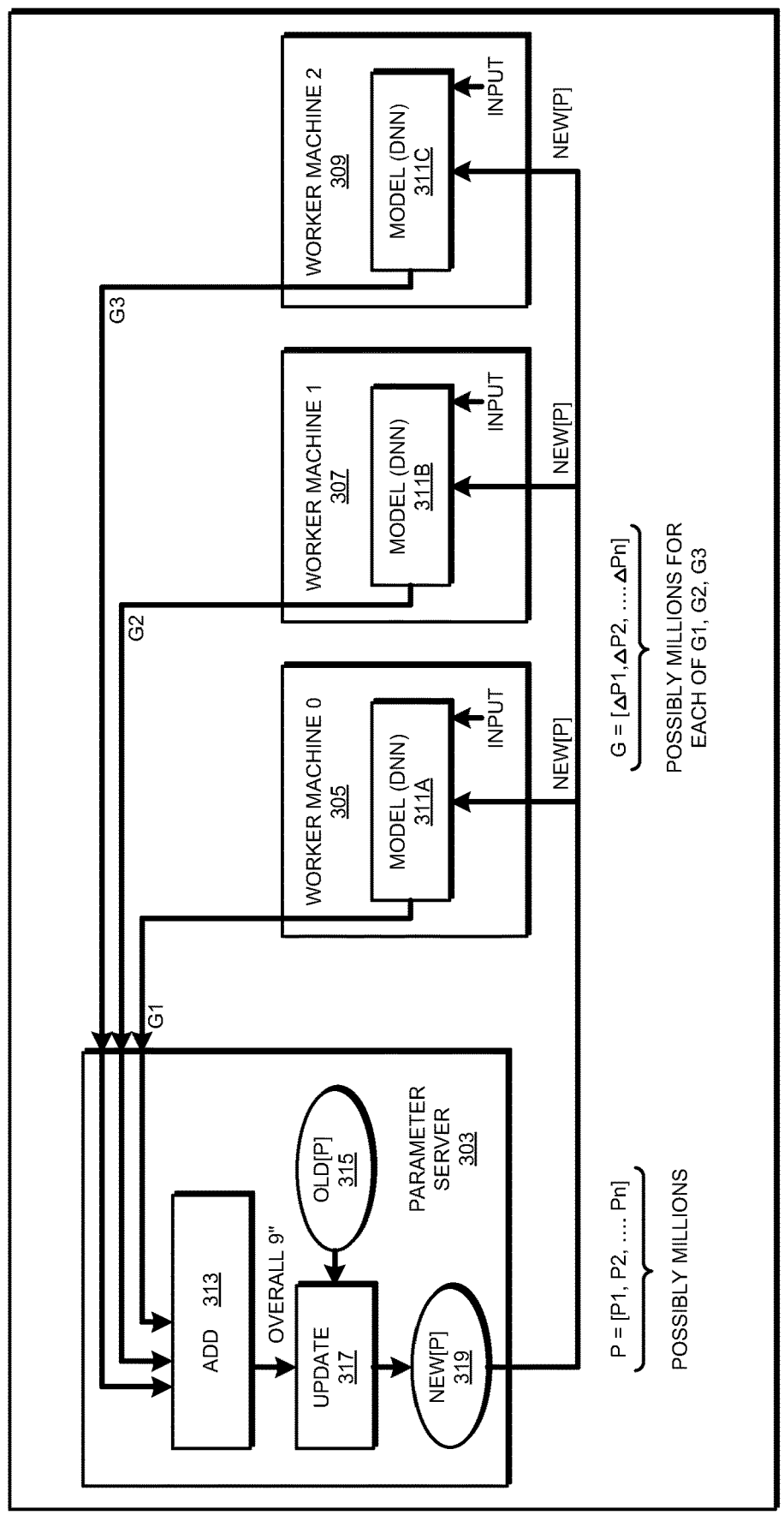
FIG. 3 depicts a block diagram of an example prior-art configuration whose data traffic can be reduced with an illustrative embodiment.

With reference to FIG. 3, this figure depicts a block diagram of an example prior-art configuration whose data traffic can be reduced with an illustrative embodiment. Parameter server 303 and worker machines 305, 307, and 309 are used in a distributed training of a model. Instances 311A, 311B, and 311C operate in worker machines 305, 307, and 309, respectively.

In an iteration of the training, worker machine 305 produces gradient vector G1, worker machine 307 produces gradient vector G2, and worker machine 309 produces gradient vector G3. Module 313 in server 303 aggregates G1, G2, and G3 to produce an overall gradient vector (G"). Module 317 uses G" and old set of weights 315 (Old [P]) to compute new set of weights 319 (new [P]). Server 303 transmits new [P] 319 to worker machine 305, 307, and 309.

Each gradient vector G1, G2, and G3 transmitted by each worker machine 305, 307, and 309 to server 303 can potentially include millions of gradient values. Similarly, new [P] 319 transmitted from server 303 to each worker machine 305, 307, and 309 can potentially include millions of new weight values. These data transmissions are significant in size and undesirable for the reasons described herein and can be significantly reduced by using the illustrative embodiments described herein.

Figure 4:
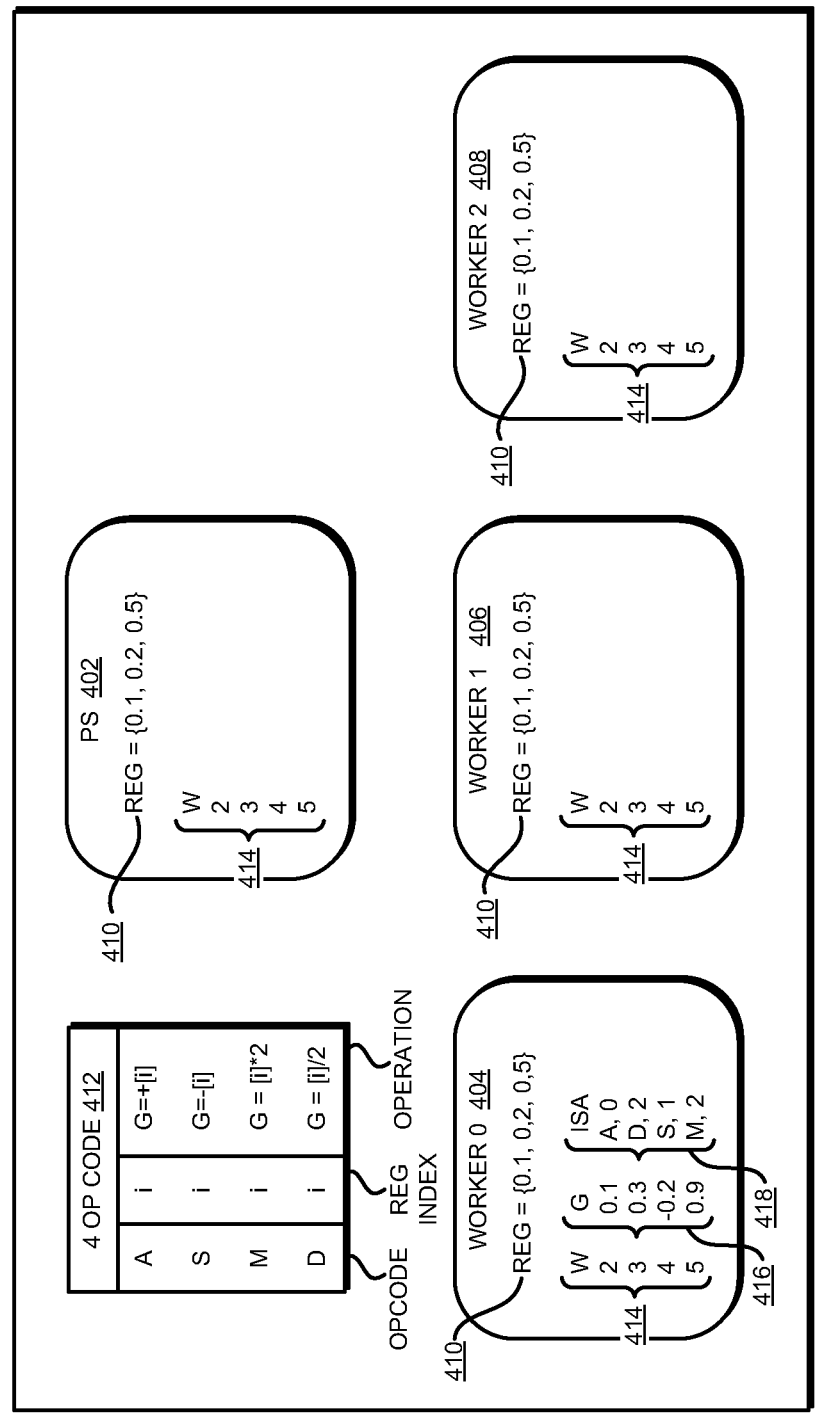
FIG. 4 depicts an example manner of encoding gradients into ISA vectors in accordance with an illustrative embodiment.

With reference to FIG. 4, this figure depicts an example manner of encoding gradients into ISA vectors in accordance with an illustrative embodiment. Parameter server 402 (PS) is an example of server 104 in FIG. 1 and operates application 105 therein (not shown in FIG. 4). worker machine 404 (Worker 0 or W0), worker machine 406 (Worker 1 or W1), and worker machine 408 (Worker 2 or W2) is each an example of a worker machine, e.g., any of worker machines 110, 112, or 132 in FIG. 1. Each of worker machines 404-408 operates an instance of application 111 of FIG. 1 (not shown in FIG. 4).

Registers 410 include a set of registers, each storing a register value. For example, as shown, register at index 0 is holding a register value of 0.1, register at index 1 is holding a register value of 0.2, and register at index 2 is holding a register value of 0.5. As of the beginning of a training iteration, register values 410 are configured identically in PS and worker machines W0, W1, and W2.

Four non-limiting example opcodes are described in legend 412 for the clarity of the description and not to imply any limitation thereto. For example, opcode "A" with register index "i" causes an addition operation to compute a gradient at a certain position in a gradient vector, where the resulting computed gradient is an additional register value at register index i (which should be added to the existing weight corresponding to that position in the gradient vector). As another example, opcode "S" with register index "i" causes a subtraction operation to compute a gradient at a certain position in a gradient vector, where the resulting computed gradient adds a negative of the register value at register index i (i.e., the register value at register index i should be subtracted from the existing weight corresponding to that position in the gradient vector).

As another example, opcode "M" with register index "i" causes a multiplication operation to compute a gradient at a certain position in a gradient vector, where the resulting computed gradient is a multiple of the register value at register index i by a certain multiplier—in this example, 2 (and the resulting gradient should be added to the existing weight corresponding to that position in the gradient vector). As another example, opcode "D" with register index "i" causes a division operation to compute a gradient at a certain position in a gradient vector, where the resulting computed gradient is a quotient of the register value at register index i divided by a certain divisor—in this example, 2 (and the resulting gradient should be added to the existing weight corresponding to that position in the gradient vector).

Weights 414 (W) is a set of weights configured for the nodes of the model, and is an example of old [P] 315 in FIG. 3. As of the beginning of a training iteration, weights 414 are configured identically in PS and worker machines W0, W1, and W2. As a non-limiting example, assume that the model being trained has only four nodes n0, n1, n2, and n3. Node n0 has weight 2 at position 0 in weights 414, n1 has weight 3 at position 1 in weights 414, n2 has weight 4 at position 2 in weights 414, and n3 has weight 5 at position 3 in weights 414.

The operations now described with respect to W0 in FIG. 4 similarly apply to W1 and W2 as well in this figure. Suppose that in an iteration, after the training inputs have been provided and outputs have been generated from the model in training, an embodiment in W0 determines that weight at position 0 should be increased by 0.1, i.e., the gradient for the existing weight at position 0 is +0.1. similarly, the embodiment determines that the weight at position 1 should be increased by 0.3, i.e., the gradient for the existing weight at position 1 is +0.3; the weight at position 2 should be reduced by −0.2, i.e., the gradient for the existing weight at position 2 is −0.2; and the weight at position 3 should be increased by 0.9, i.e., the gradient for the existing weight at position 3 is +0.9. gradient vector 416, which is an example of G1 in FIG. 3, contains these gradient values in their respective positions.

An embodiment in W0 computes ISA vector 418 corresponding to gradient vector 416 in a manner described herein. For example, the embodiment determines that opcode A from opcodes 412 with the register value at register index 0 in registers 410 computes to approximately the gradient at position 0 in gradient vector 416. Accordingly, the embodiment constructs ISA instruction (A,0) in position 0 of ISA vector 418. The embodiment constructs other ISA instructions in positions 1, 2, and 3 in ISA vector 418 in a similar manner.

Figure 5:
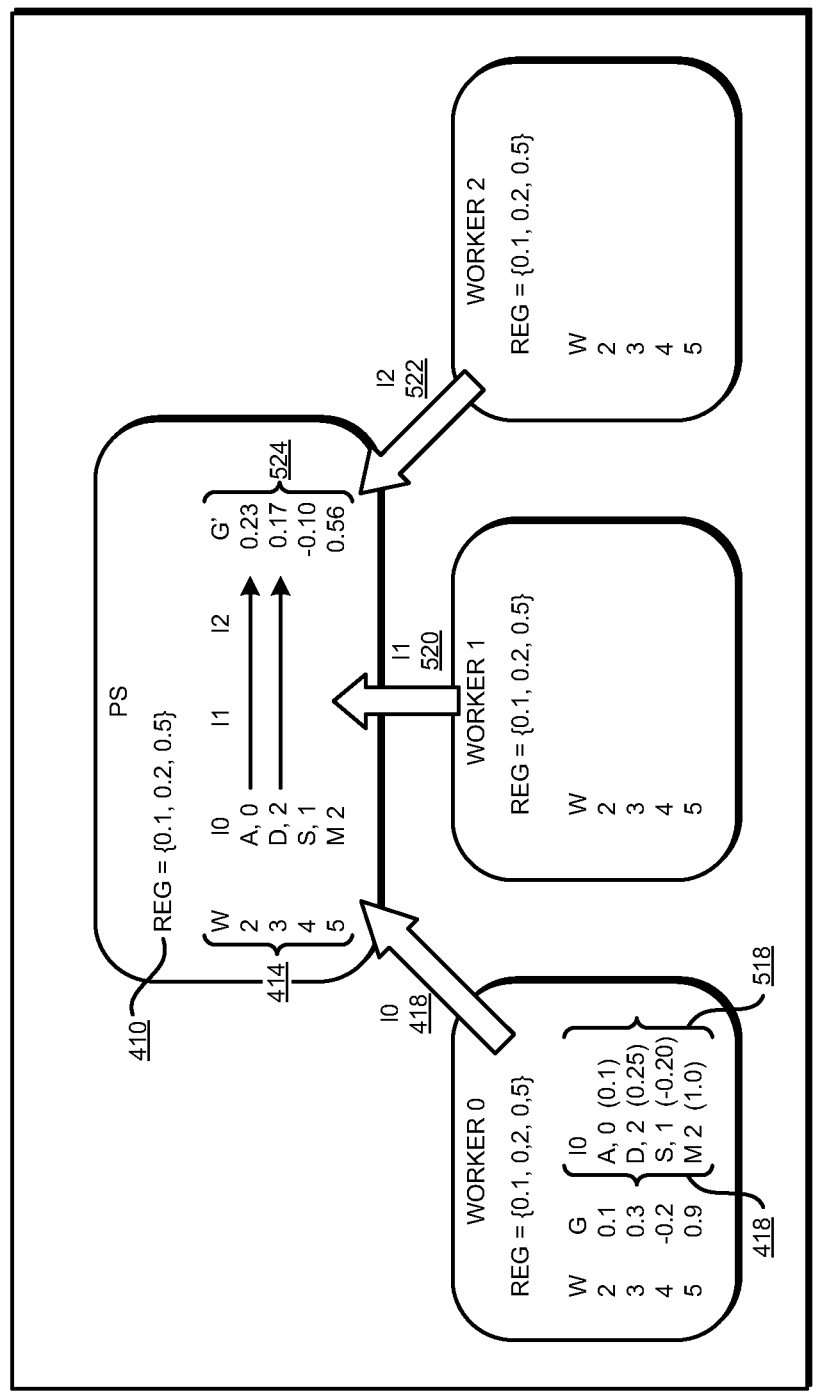
FIG. 5 depicts an example manner of transmitting and decoding ISA vectors in accordance with an illustrative embodiment.

With reference to FIG. 5, this figure depicts an example manner of transmitting and decoding ISA vectors in accordance with an illustrative embodiment. PS, W0, W1, and W2 remain configured in the manner of FIG. 4.

The approximate gradients computable from ISA vector 418 are shown in computed gradient vector 518. Computed gradient vector 518 is depicted in W0 only for the purposes of this description. An embodiment need not compute gradient vector 518 in W0.

An embodiment in PS computes gradient vector 518 in PS once W0 transmits ISA vector 418 (I0) to PS. The embodiment receives ISA vector 520 (I1) from W1 and ISA vector 522 (I2) from W2 in a similar manner and computes the gradient vector approximations for W1 and W2 in a similar manner. Using the computed gradient vectors for all worker machines that reported ISA vectors, the embodiment computes overall gradient vector 524 (G') in a manner described herein.

Figure 6:
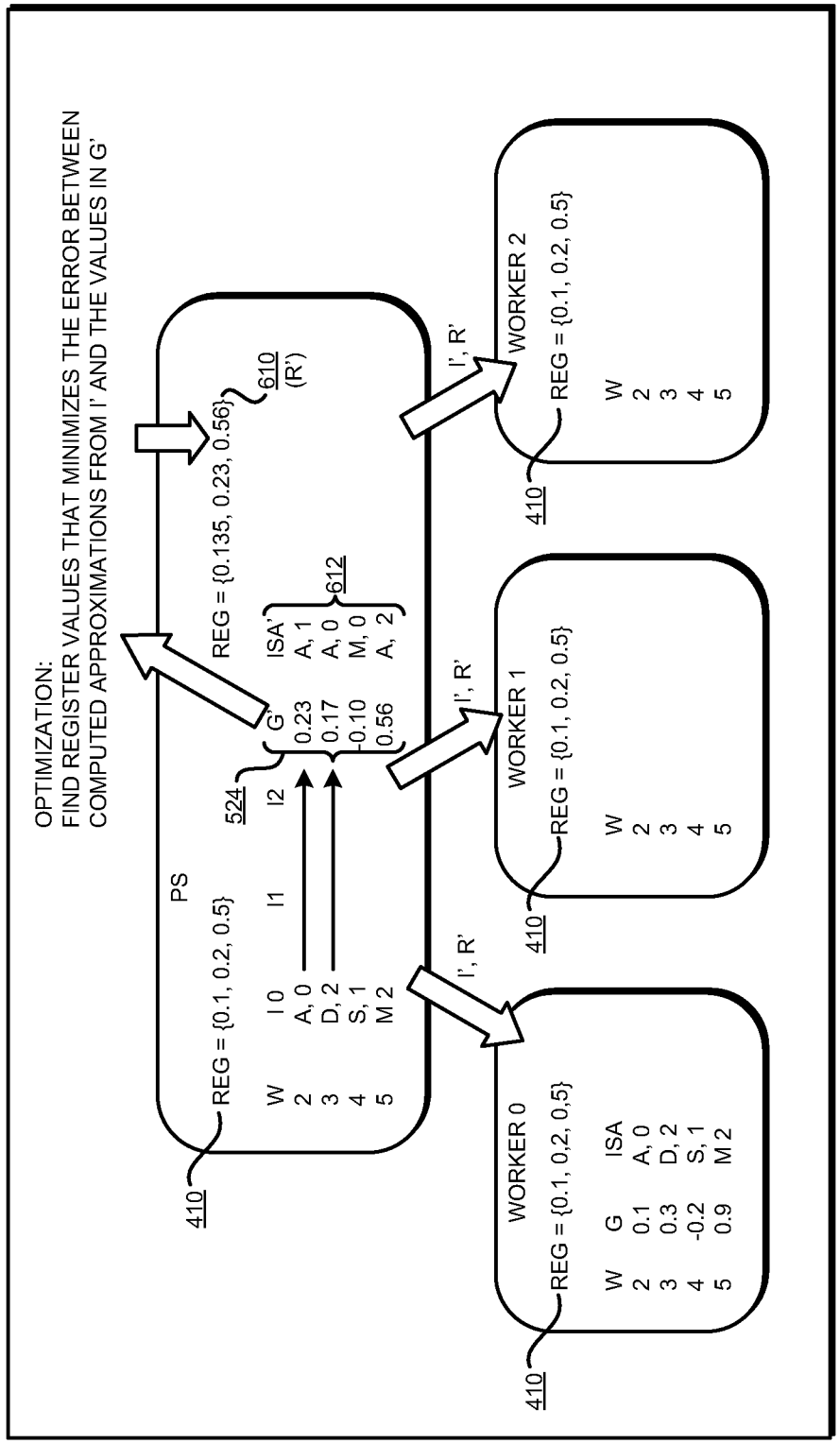
FIG. 6 depicts an example manner of computing and transmitting ISA-based updates from a parameter server in accordance with an illustrative embodiment.

With reference to FIG. 6, this figure depicts an example manner of computing and transmitting ISA-based updates from a parameter server in accordance with an illustrative embodiment. PS, W0, W1, and W2 remain configured in the manner of FIG. 5.

At this point in the training register values 410 are the register values used in the previous iteration. An embodiment operating in PS computes revised register values 610. Revised register values 610 (R') are optimized values at some or all register indexes such that ISA vector 612 (I'), when populated with ISA instructions using opcodes 412, can compute to approximations of the gradient values in G' 524 within a tolerance. In other words, for an ISA instruction at a certain position in I', the opcode applied to a register value in R' should have an error of less than a tolerance value relative to a gradient value at the same position in G'.

The embodiment updates the registers at PS to overwrite register values 410 with register values 610. The embodiment transmits I' and R' to each worker machine still participating in the next iteration of the training.

Figure 7:
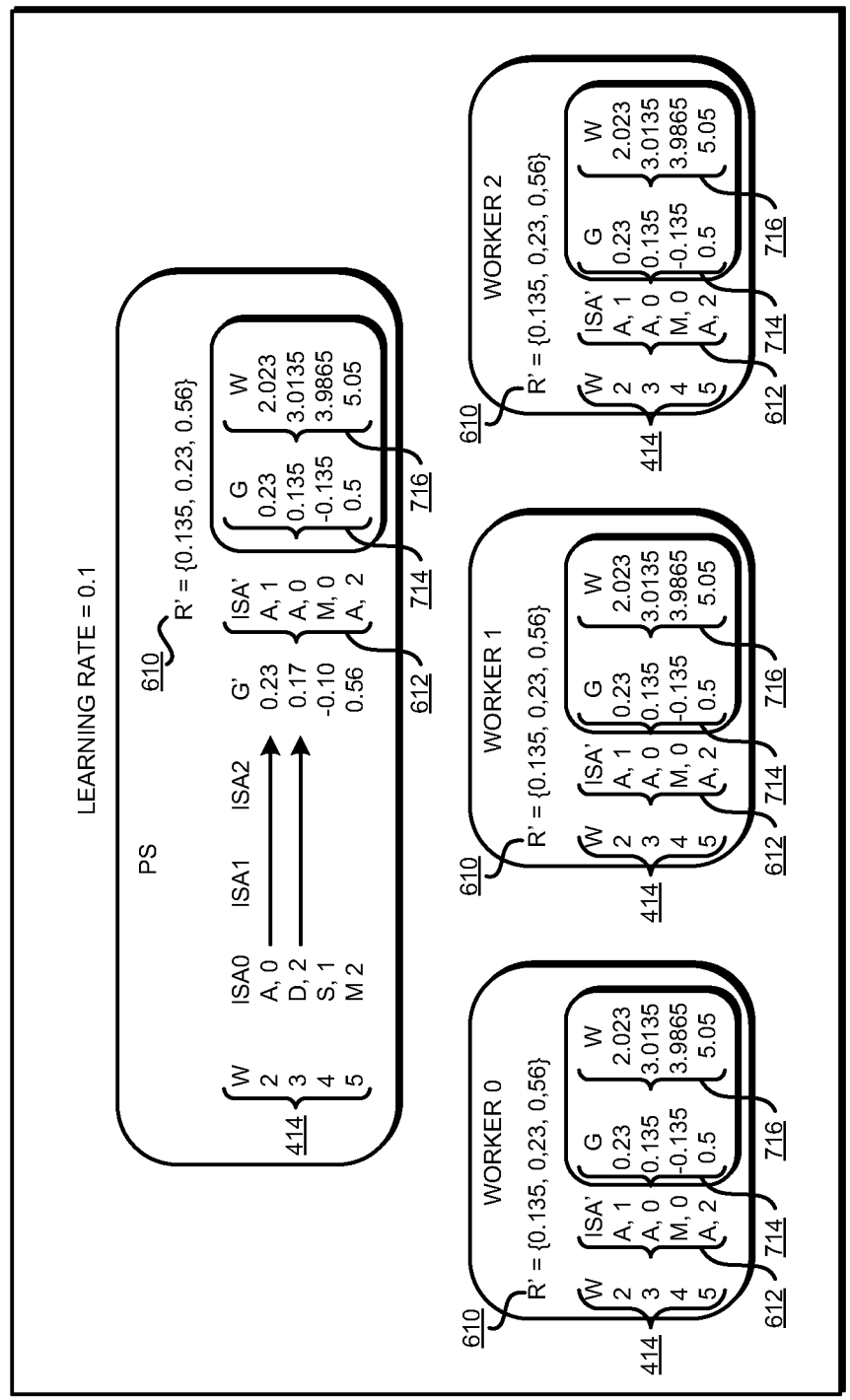
FIG. 7 depicts an example manner of updating the model weights at the worker machines in accordance with an illustrative embodiment.

With reference to FIG. 7, this figure depicts an example manner of updating the model weights at the worker machines in accordance with an illustrative embodiment. PS, W0, W1, and W2 remain configured in the manner of FIG. 6.

The transmitting of I' and R' from PA to the worker machines causes an embodiment at a worker machine, e.g., at W0, to overwrite register values 410 with register values 610 in the registers at the worker machine. The transmitting also causes the worker machine embodiment, e.g., at W0, to locally compute an approximation of G' using I' and R' register values 410 to be overwritten with register values 610 in the registers at the worker machines. All embodiments at PS and worker machines compute gradient approximations vector gradient vector 714 (G+) using I' and R'. The various embodiments at their respective locations apply G+ to previous set of weights W 414 to compute new set of weights W' (716) for the model being trained at their respective locations.

Figure 8:
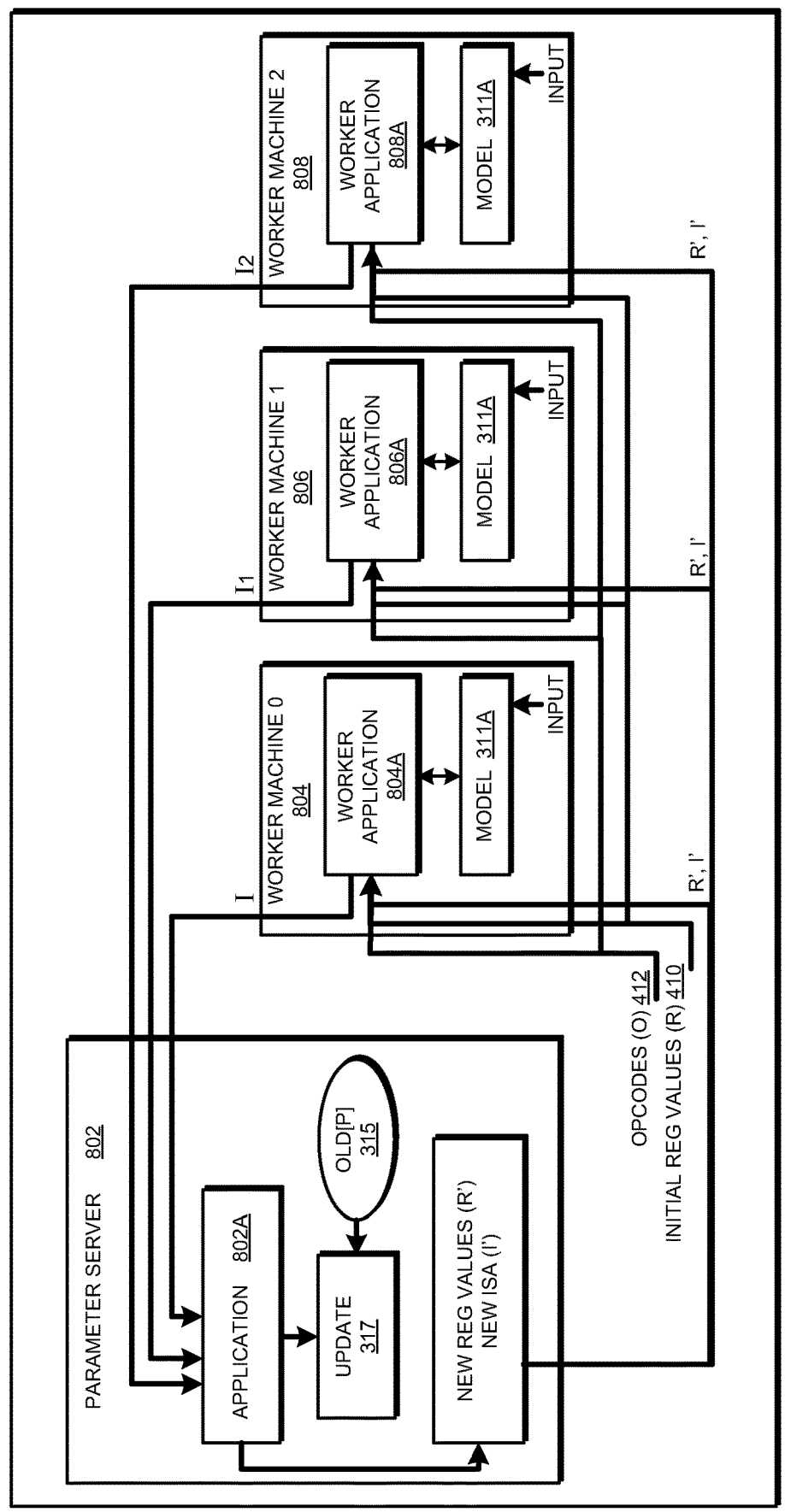
FIG. 8 depicts an example configuration for ISA-based compression in distributed training of neural networks in accordance with an illustrative embodiment.

With reference to FIG. 8, this figure depicts an example configuration for ISA-based compression in distributed training of neural networks in accordance with an illustrative embodiment. PS 802 is an example of PS in FIG. 7, or a modified form of parameter server 303 in FIG. 3, or server 104 in FIG. 1. Application 802A is an example of server-side application 105 in FIG. 1.

Wm 804 (W0), 806 (W1), and 808 (W2) is each an example of W0, W1, and W2, respectively, in FIG. 7, or a modified form of worker machine 305, 307, and 309, respectively, in FIG. 3, or any of worker machines 110, 112, and 132 in FIG. 1. Worker applications 804A, 806A, and 808A are each an example of worker application 111 in FIG. 1. Model 311A is again used as a non-limiting example only for the purposes of the clarity of the description. Model 311A is trained in a distributed manner using W0, W1, and W2 as described herein.

Suppose that the training is at a stage where weight vector 315 (old [P]) associated with the nodes of the instances of model 311A. Old [P] could be the initial weights at the beginning of the training or the previous weights from a previous iteration in the training.

Each worker application 804A, 806A, and 808A is configured with opcodes 412 (O). Each worker application 804A, 806A, and 808A is configured with register values 410 (R), which could be initial register values at the beginning of the training or the previous register values from a previous iteration in the training.

The operations described with respect to W0 apply similarly with respect to W1 and W2. Model 311A in W0 is provided training inputs. Application 804A computes or receives the gradients for old [P] weights of model 311A. Application 804A constructs a gradient vector. Application 804A transforms the gradient vector in to an ISA vector (I0) using opcodes 412 and R 410. Application 804A transmits I0 to PS 802.

Application 802A receives I0 from W0 (and I1 and I2 from W1 and W2, respectively). Application 802A computes a gradient vector corresponding to I0 using opcodes 412 and R 410. Application 802A computes an overall gradient vector from the computed gradient vectors of each worker machine. Application 802A optimizes R 410 to produce R' 610 as in FIG. 6. Using O 412 and R' 610, application 802A computes I' 612 at PS 802. Using I' 612 and R' 610, application 802A computes approximated overall gradient vector G+ 714 as in FIG. 7 at PS 802.

Application 802A passes G+ 714 to update module 317. Update module 317 uses old [P] 317 with G+ 714 to compute new weight vector new [P] 319 in FIG. 3. Application 802A also transmits I' 612 and R' 610 to worker application 804A in W0 (and worker application 806A in W1 and worker application 808A in W2).

Worker application 804A computes G+ 714 locally at W0 using I' 612 and R' 610. Worker application 804A updates the weights of model 311A instance in W0 with the locally computed G+ 714. Updated model 311A is now ready for another iteration of the training.

Figure 9A:
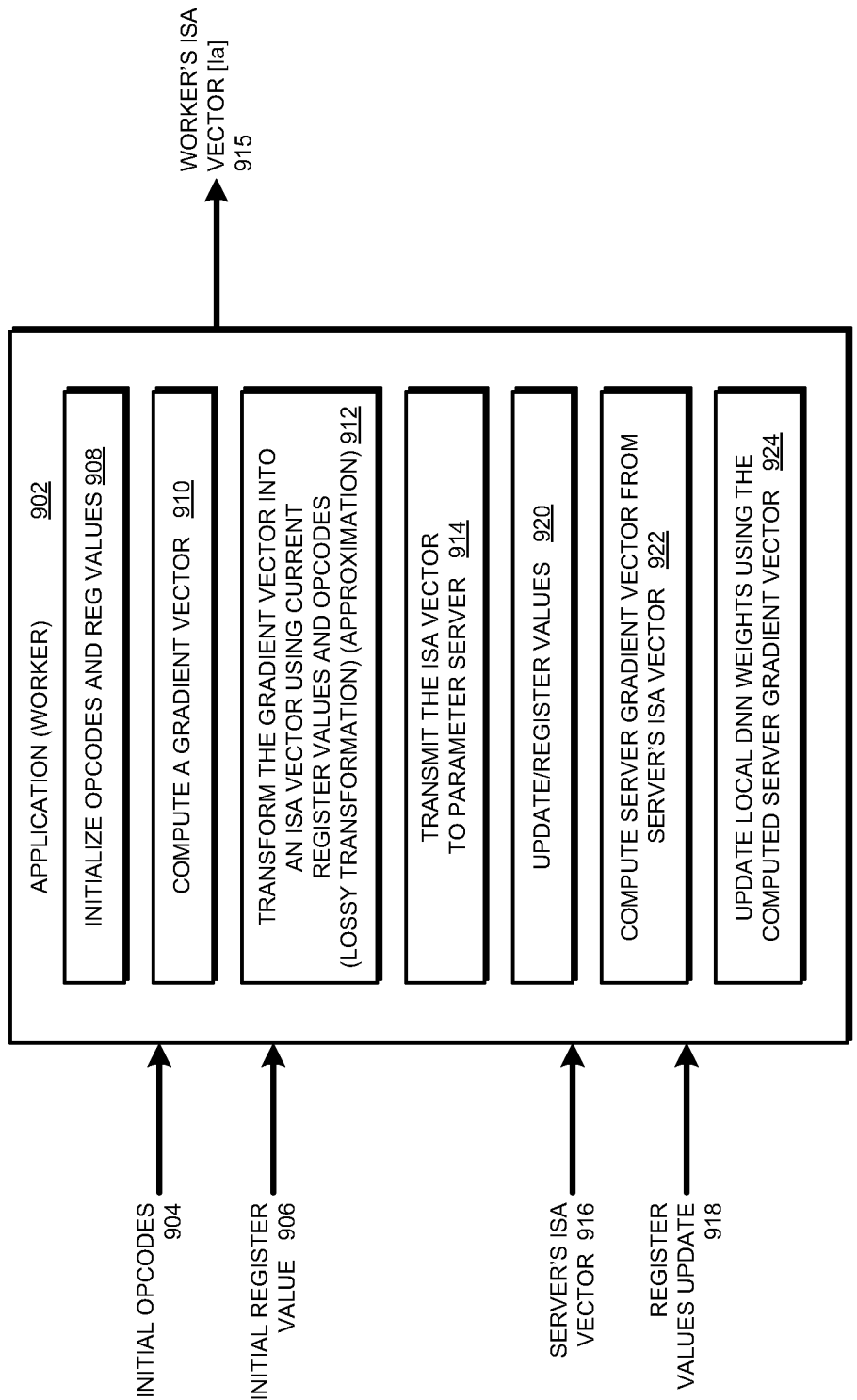
FIG. 9A depicts an example configuration for a worker application in accordance with an illustrative embodiment.

With reference to FIG. 9A, this figure depicts an example configuration for a worker application in accordance with an illustrative embodiment. Worker application 902 can be implemented as worker application 804A in worker machine 804 in FIG. 8.

Application 902 receives opcodes 904 and initial register values 906. Component 908 initializes the opcodes and register values using opcodes 904 and initial register values 906. After an iteration of training, component 910 computes a gradient vector for the model in training.

Component 912 transforms the gradient vector into an ISA vector (915) ("Ia" from worker machine "a") using the current register values and opcodes. If any compaction of ISA vector 915 is possible, e.g., as in the "repeat" example described earlier, component 912 performs such compaction of ISA vector 915. Component 914 transmits the worker machine's ISA vector 915 to a parameter server.

Application 902 receives ISA vector 916 from the server. Application 902 also receives updated register values 918 from the server. Component 920 updates the local register values using updated register values 918. Component 922 computes the server's gradient vector from ISA vector 916 and register values 918. Component 924 updates the local neural network weights using the computed server gradient vector. The local model instance is now ready for the next iteration of the training.

Figure 9B:
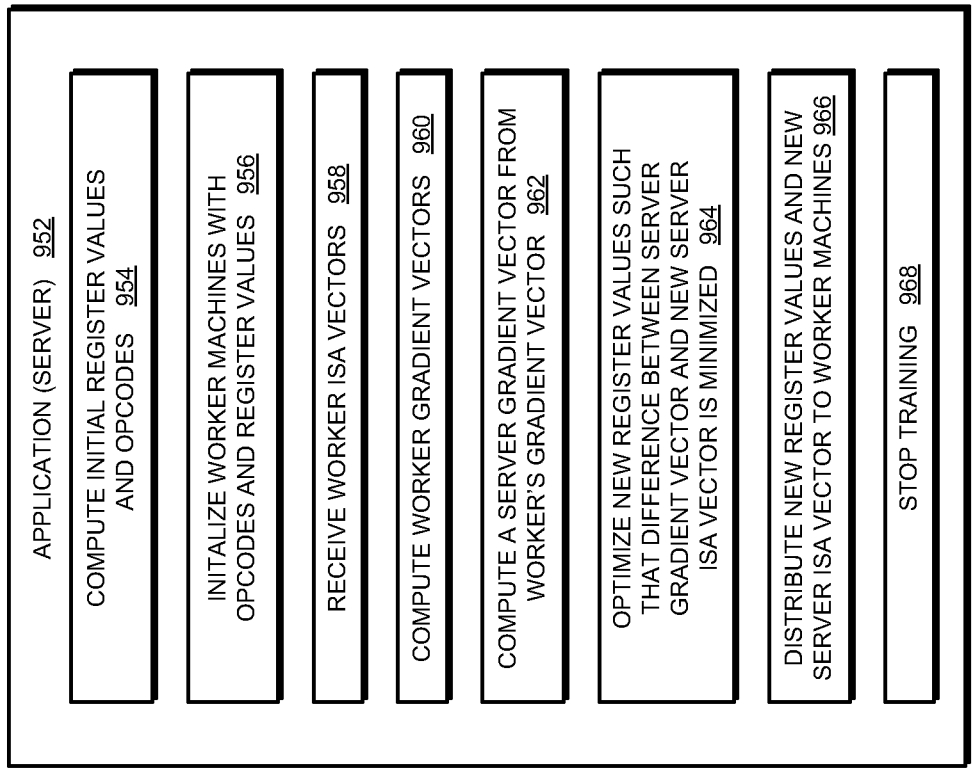
FIG. 9B depicts an example configuration for a server-side application in accordance with an illustrative embodiment.

With reference to FIG. 9B, this figure depicts an example configuration for a server-side application in accordance with an illustrative embodiment. Application 952 can be implemented as application 802A in PS 802 in FIG. 8.

Component 954 computes the initial register values and configures the opcodes. Component 956 initializes a set of worker machines with the opcodes and initial register values. The function of components 954 and 956 may be implemented separately from application 952.

Component 958 receives the ISA vectors from worker machines. Component 960 computes the gradient vector of the worker machine using the worker machine's ISA vector and the initial register values for the first iteration or the register values currently in effect for a given iteration. Component 962 computes an overall gradient vector—the server's gradient vector G'—from a set of worker machine gradient vectors thus computed. Component 964 optimizes the register values to create R' 610 and computes server's ISA vector I' 612 such that an error between G+ 714 (computed from R' and I') and the overall gradient vector is minimized. Component 966 distributes R' and I' to the set of worker machines.

Component 968 determines whether the training should be stopped according to a stopping condition or input. If the training has to be stopped, component 968 stops the model training at one or more worker machines.

Figure 10A:
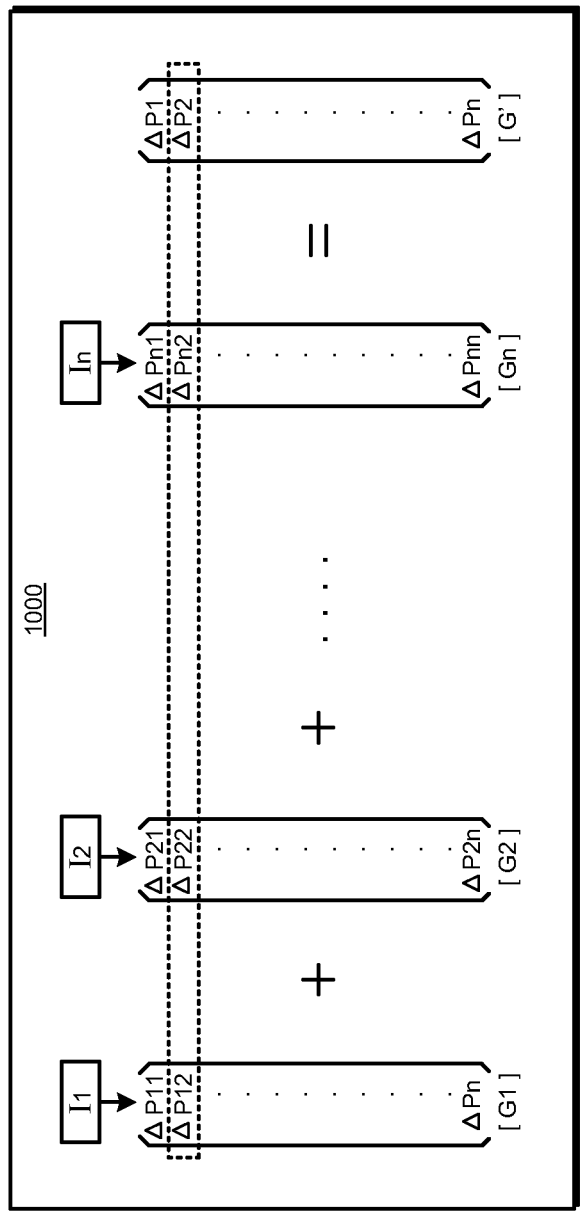
FIG. 10A depicts a step in one example manner of computing an overall gradient vector in accordance with an illustrative embodiment.

With reference to FIG. 10A, this figure depicts a step in one example manner of computing an overall gradient vector in accordance with an illustrative embodiment. Suppose that n worker machines are training a model and provide ISA vector I1, I2, . . . In in an iteration of the training. I1 is usable to compute the approximate deltas (or differences) between what the weights of the model are in the iteration and what they should be. The set of deltas for a set of weights for a worker machine forms the computed gradient vector for that worker machine. Using the various deltas in the same position in each of the computed gradient vectors, an overall delta is computed for that position in the overall gradient vector G'.

Figure 10B:
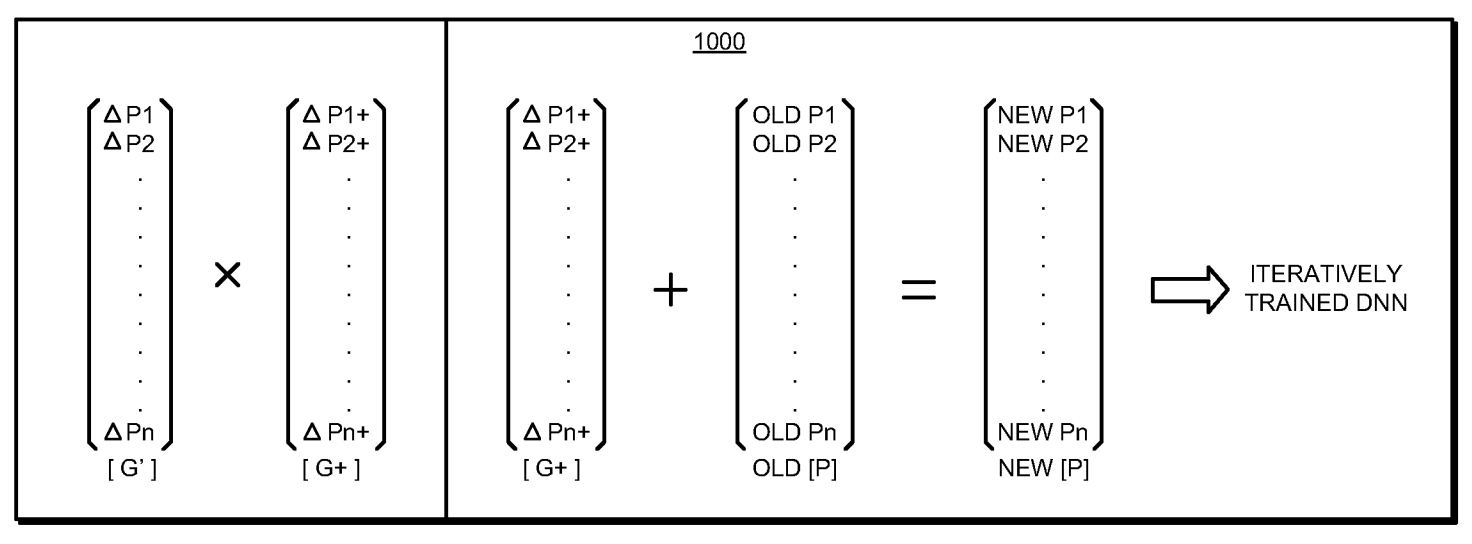

With reference to FIG. 10B, this figure depicts another step in one example manner of computing an overall gradient vector in accordance with an illustrative embodiment. gradient vector G' obtained in FIG. 10A is modified using a function K, e.g., an averaging function. Using R' and I' computed therefrom, approximated overall gradient vector G+ is computed, where each delta in G+ is an approximation of an actual delta in G' as modified by function K. The approximated deltas of G+ when added to old [P] results in new [P]. New [P] allied to the model creates a model that has been trained from the previous iteration.

Figure 10C:
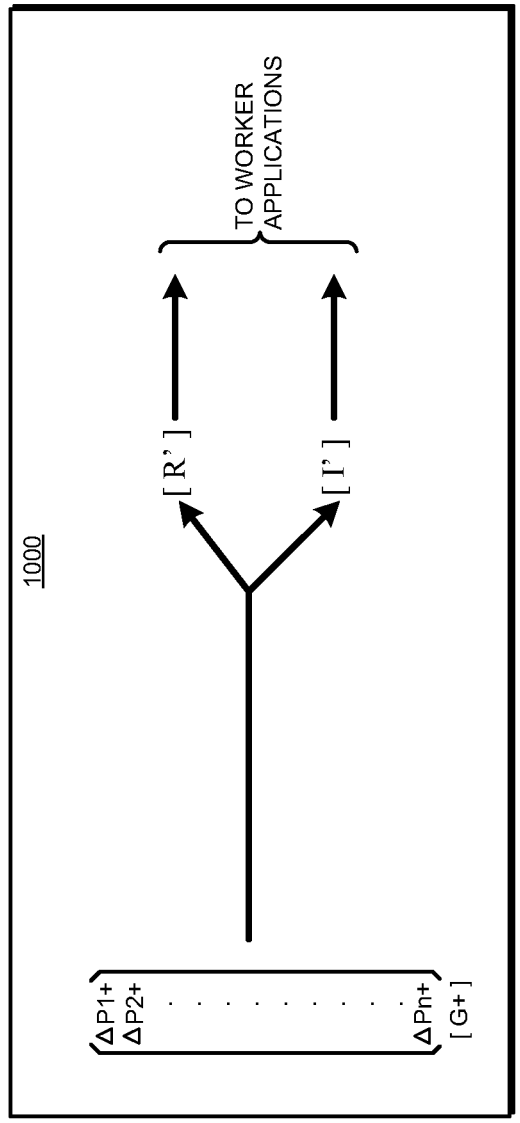
FIG. 10C depicts another step in one example manner of computing an overall gradient vector in accordance with an illustrative embodiment.

With reference to FIG. 10C, this figure depicts another step in one example manner of computing an overall gradient vector in accordance with an illustrative embodiment. gradient vector G+ obtained in FIG. 10B results from the computations of R' and I' as described herein. The set R' of revised register values and the server ISA vector I' are broadcast or otherwise transmitted to each remaining participant worker machine.

Figure 11:
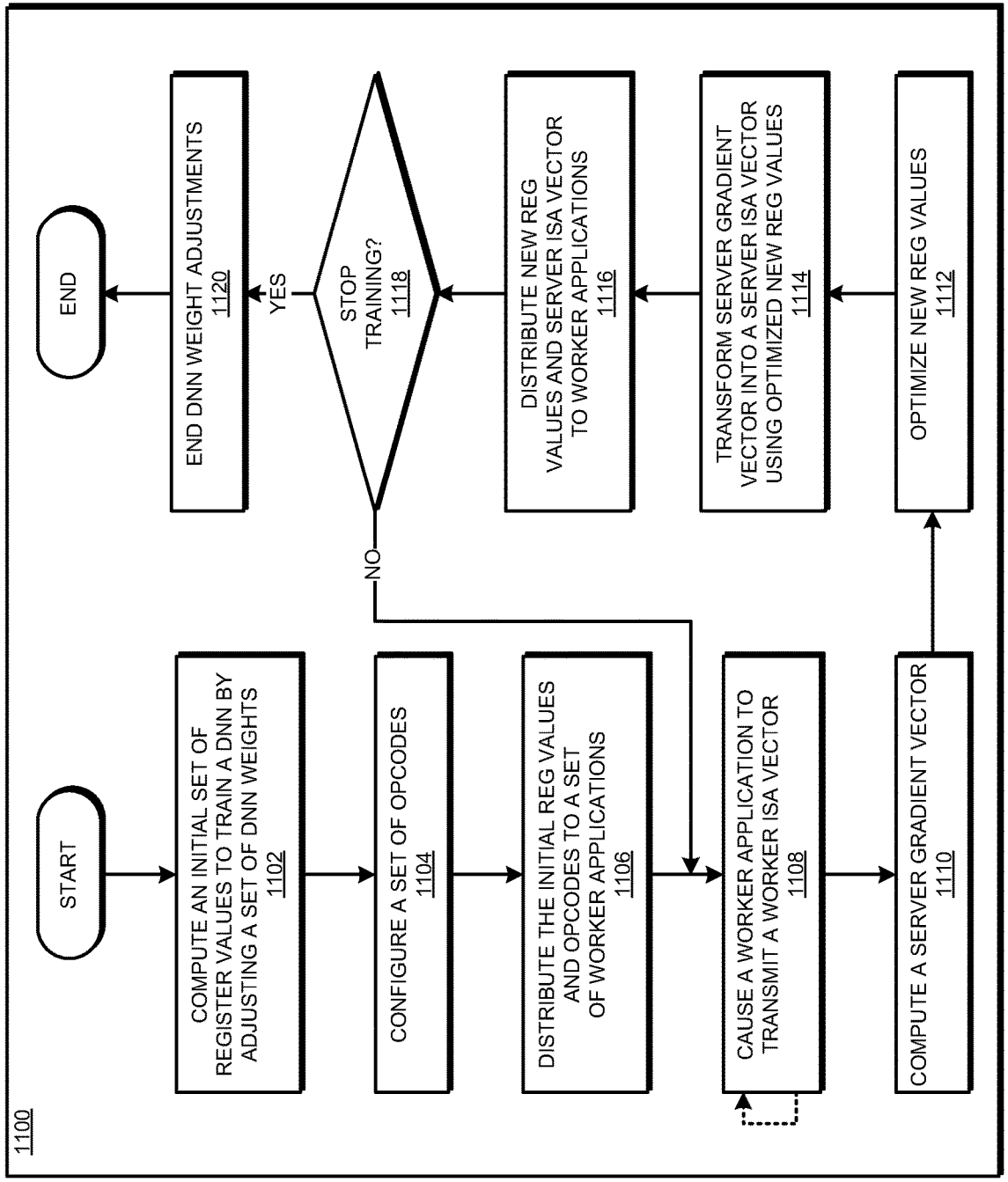
FIG. 11 depicts a flowchart of an example process for ISA-based compression in distributed training of neural networks in accordance with an illustrative embodiment.

With reference to FIG. 11, this figure depicts a flowchart of an example process for ISA-based compression in distributed training of neural networks in accordance with an illustrative embodiment. Process 1100 can be implemented in server-side application 952 in FIG. 9B.

The application (optionally) computes an initial set of register values to train a neural network, e.g., a DNN, by adjusting a set of weights associated with the neural network nodes (block 1102).

The application (optionally) configures a set of opcodes (block 1104). The application distributes the initial register values and the opcodes to a set of worker applications in a set of worker machines (block 1106).

The application causes a worker application to transmit a worker machine's ISA vector (block 1108). Block 1108 repeats for as many worker machines as may be participating in the training at a given iteration. The application computes a server's gradient vector—the overall gradient vector G'—from the worker machines' ISA vectors (block 1110).

From the server's gradient vector, the application computes optimized revised register values (block 1112). The application transforms the server's gradient vector into a server's ISA vector using the revised register values (block 1114). The application distributes the revised register values and the server's ISA vector to the worker applications in the participating worker machines (block 1116).

The application determines whether the training should be stopped (block 1118). If the training should not be stopped ("No" path of block 1118), the application returns to block 1108. If the training should be stopped ("No" path of block 1118), the application ends further adjustments to the neural network weights (block 1120). The application ends process 1100 thereafter.

Figure 12:
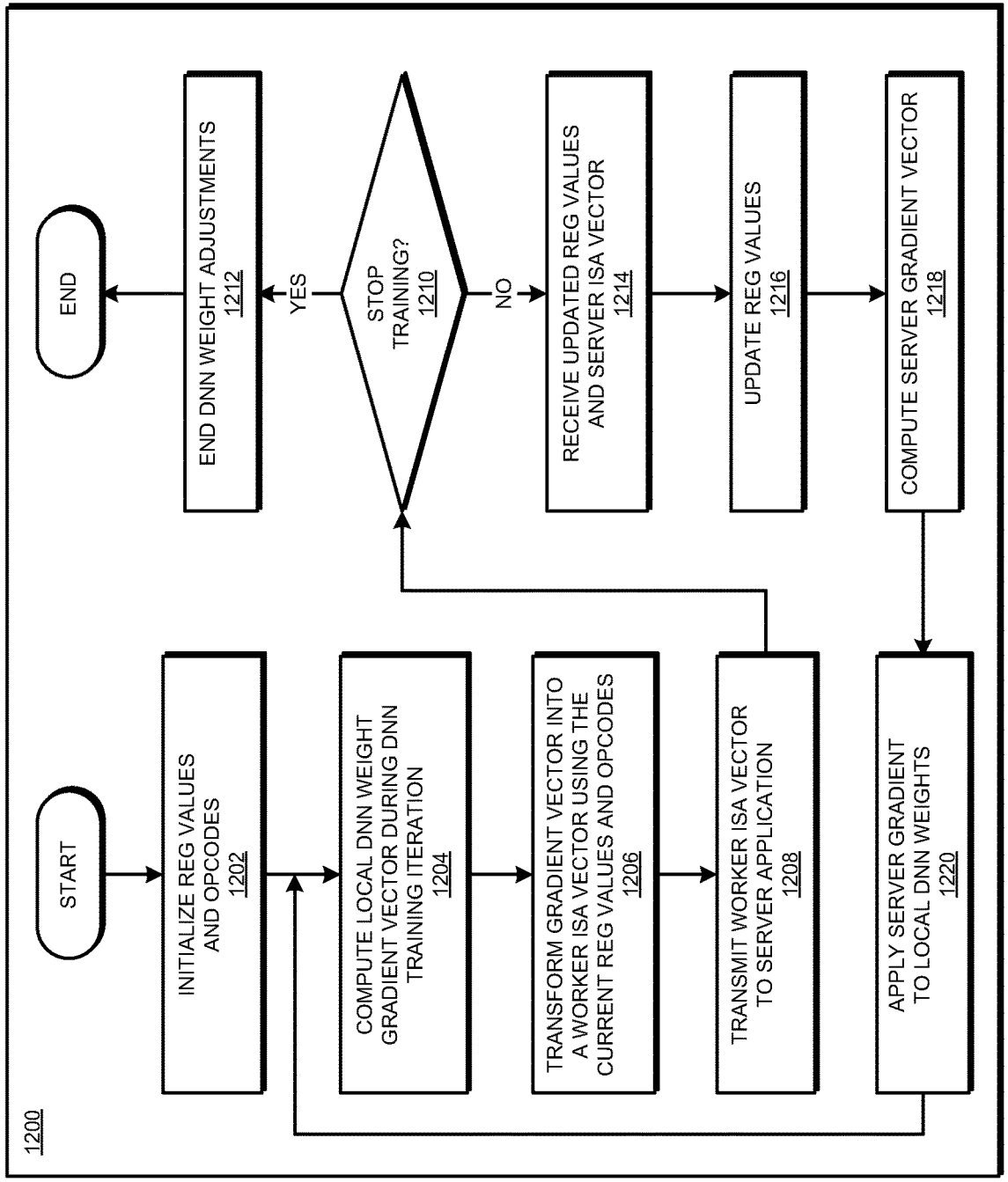
FIG. 12 depicts a flowchart of an example process for ISA-based compression in distributed training of neural networks in accordance with an illustrative embodiment.

With reference to FIG. 12, this figure depicts a flowchart of an example process for ISA-based compression in distributed training of neural networks in accordance with an illustrative embodiment. Process 1200 can be implemented in worker machine-side application 902 in FIG. 9A.

The application initializes register values and opcodes (block 1202). The application computes a local weight gradient vector during a model training iteration (block 1204). The application transforms the gradient vector into an ISA vector of the worker machine using the register values that are current for the iteration and the configured opcodes (block 1206). The application transmits the worker machine's ISA vector to a server application (block 1208).

The application determines whether the training should be stopped (block 1210). If the training should be stopped ("Yes" path of block 1210), the application ends the weight adjustments in the model (block 1212). The application ends process 1200 thereafter. If the training should not be stopped ("No" path of block 1210), the application receives revised register values and a server ISA vector (block 1214). The application updates the previously stored register values (block 1216). The application computes the server's approximated gradient vector (block 1218). The application applies the server's approximated gradient vector to the existing weights of the model (block 1220). The application returns to block 1204 thereafter.

Figure 13:
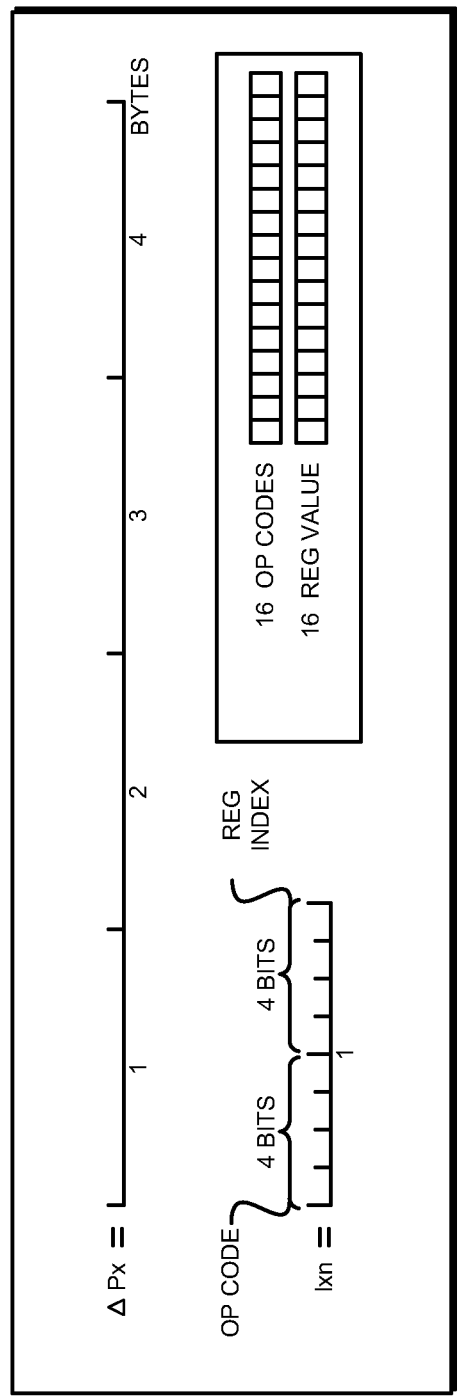
FIG. 13 depicts a block diagram of one example manner of compacting data transmission during distributed neural network training in accordance with an illustrative embodiment.

With reference to FIG. 13, this figure depicts a block diagram of one example manner of compacting data transmission during distributed neural network training in accordance with an illustrative embodiment. Suppose that ΔPx in worker machine n is a gradient value for node x, and uses a 4-byte representation. Corresponding ISA instruction Ixn is configured as a 1-byte instruction in one non-limiting example, as depicted. Ixn uses 4 bits for opcode reference and 4 bits for register index. The 4-bit representation of opcodes allows for sixteen opcodes to be used. Similarly, the 4-bit register index allows for sixteen register values to be used.

Figure 14:
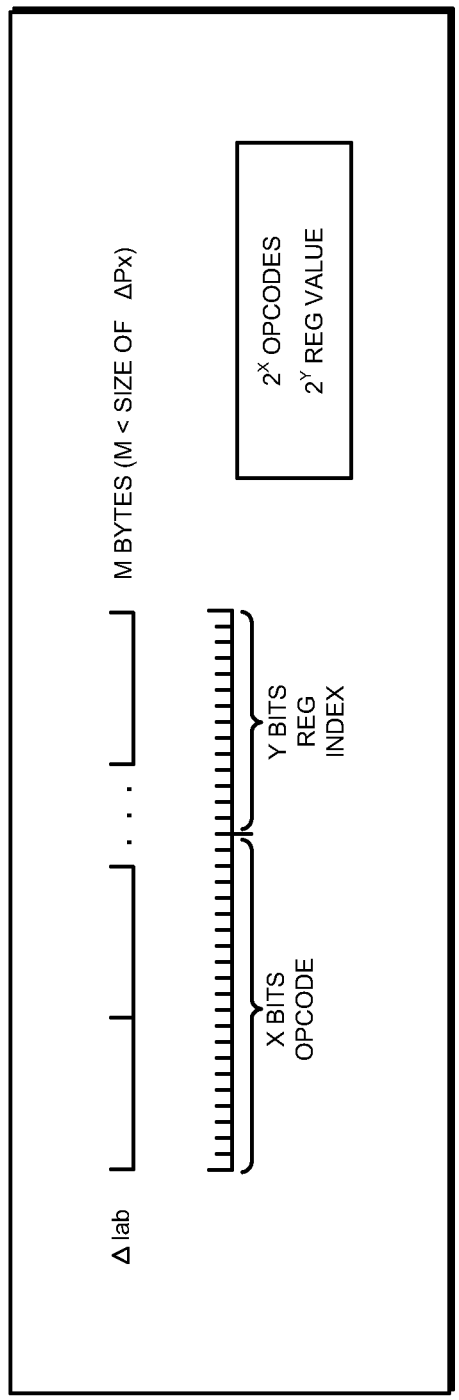
FIG. 14 depicts a block diagram of another example manner of compacting data transmission during distributed neural network training in accordance with an illustrative embodiment.

With reference to FIG. 14, this figure depicts a block diagram of another example manner of compacting data transmission during distributed neural network training in accordance with an illustrative embodiment. Suppose that ΔPx in worker machine n is a gradient value for node x, and uses P number of bytes to represent the value. Corresponding ISA instruction Ixn is configured as an instruction that uses M number of bytes in another non-limiting example, as depicted. M is less than P. Ixn uses x number of bits for opcode reference and y number of bits for register index. The x-bit representation of opcodes allows for $2^x$ opcodes to be used. Similarly, the y-bit register index allows for $2^y$ register values to be used.

Figure 15:
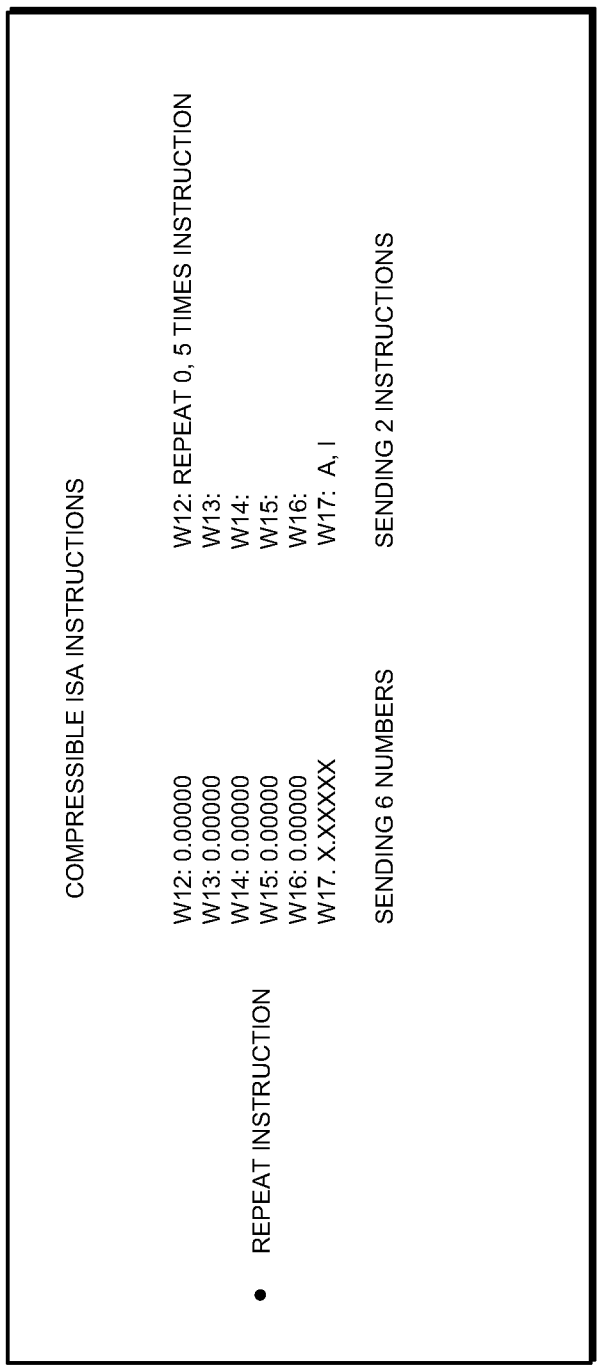
FIG. 15 depicts a block diagram of another example manner of compacting data transmission during distributed neural network training in accordance with an illustrative embodiment.

With reference to FIG. 15, this figure depicts a block diagram of another example manner of compacting data transmission during distributed neural network training in accordance with an illustrative embodiment. Suppose that W12, W13, W14, W15, and W16 represent five consecutive gradient values that are all zeros in a given gradient vector of a given worker machine for a given iteration. According to one embodiment, instead of transmitting five similar instructions that all compute to approximately zero in the corresponding ISA vector, the embodiment transmits a repeat instruction that causes an ISA instruction at W12 to be repeated five times to compute five consecutive gradients approximating W12, W13, W14, W15, and W16.

Figure 16:
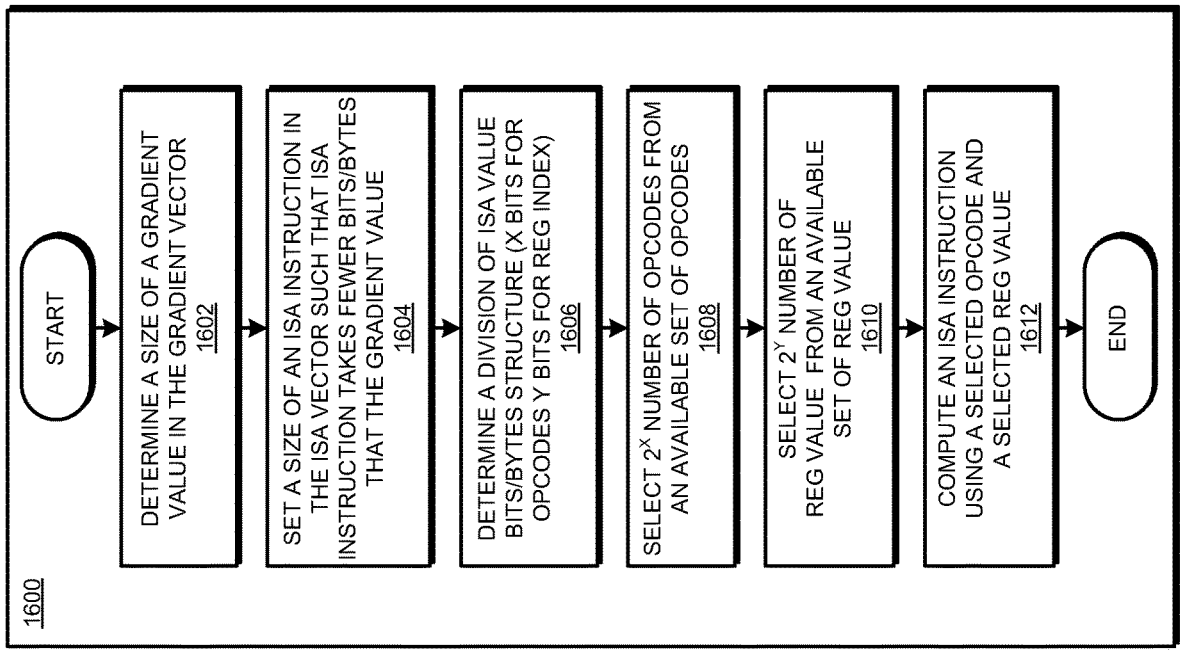
FIG. 16 depicts a flowchart of an example process for flexibly using compact ISA instructions in accordance with an illustrative embodiment.

With reference to FIG. 16, this figure depicts a flowchart of an example process for flexibly using compact ISA instructions in accordance with an illustrative embodiment. Process 1600 can be implemented in worker machine-side application 902 in FIG. 9A, in server-side application 952 in FIG. 9B, or both.

The application determines a byte-size of a gradient value in the gradient vector of the worker machine (block 1602). The application sets a byte-size of an ISA instruction in the ISA vector, where the byte-size of the ISA instruction is smaller than the byte-size of the gradient value (block 1604).

The application determines a division of the ISA instruction bits structure, e.g., the p/x/y structure, the p/d structure or other structures described herein (block 1606). Assuming the p/x/y structure, the application selects $2^x$ number of opcodes from an available set of opcodes (block 1608) and $2^y$ number of register values from a set of register values (block 1610). The application constructs an ISA instruction for the ISA vector using a selected opcode and a selected register index (block 1612). The application ends process 1600 thereafter.

Figure 17:
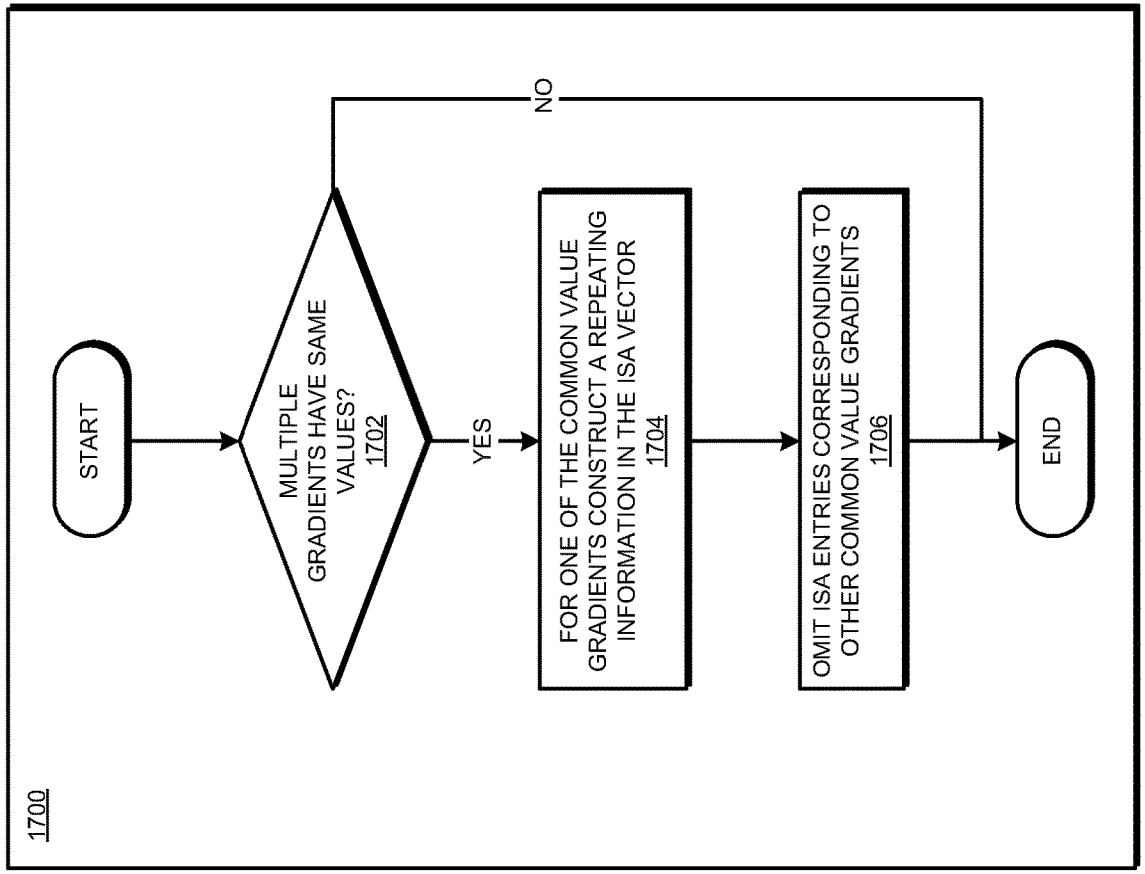
FIG. 17 depicts a flowchart of an example process for compacting an ISA vector in accordance with an illustrative embodiment.

With reference to FIG. 17, this figure depicts a flowchart of an example process for compacting an ISA vector in accordance with an illustrative embodiment. Process 1700 can be implemented in worker machine-side application 902 in FIG. 9A, in server-side application 952 in FIG. 9B, or both.

The application determines whether multiple consecutive gradients have the same or similar values within a specified tolerance (block 1702). If multiple consecutive gradients do not have the same or similar values within a specified tolerance ("No" path of block 1702), the application takes no compacting action and ends process 1700 thereafter.

If multiple consecutive gradients have the same or similar values within a specified tolerance ("Yes" path of block 1702), the application constructs, for one gradient having a similar value, a repeating ISA instruction in the ISA vector (block 1704). The application omits creating ISA instructions in the ISA vector for other consecutive gradients with the similar value (block 1706). The application ends process 1700 thereafter.

Thus, a computer implemented method, system or apparatus, and computer program product are provided in the illustrative embodiments for ISA-based compression in distributed training of neural networks and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, including but not limited to computer-readable storage devices as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
computing, using a processor and a memory at a parameter server, an overall gradient vector from a set of instruction set architecture (ISA) vectors corresponding to a set of worker machines, a first ISA vector of a first worker machine comprising a first set of ISA instructions corresponding to a first set of gradients, each gradient in the first set of gradients corresponding to a weight of a node of a first neural network instance being distributedly trained in the first worker machine;
optimizing a set of register values such that when an optimized register value in the set of optimized register values is used in an approximation computation with an opcode from a set of opcodes the approximation computation produces an x-th approximate gradient that is within a tolerance value of an actual value of an x-th gradient in the overall gradient vector;
constructing a server ISA vector, wherein in the server ISA vector, a server ISA instruction in an x-th position in the server ISA vector corresponds to the x-th gradient in the overall gradient vector; and
causing a processor and a memory at the first worker machine to update a set of weights of a set of nodes of the first neural network instance being distributedly trained in the first worker machine, the set of weights being updated using the set of optimized register values and the server ISA vector.

2. The method of claim 1, further comprising:
configuring, before initiating a first iteration of training a distributed set of neural network instances, the set of opcodes in each worker machine of the set of worker machines, wherein each worker machine in the set of worker machines trains one neural network instance from the set of distributed neural network instances, each neural network instance in the set of distributed neural network instances being identical, and wherein different neural network instances in different worker machines are subjected to different training inputs; and
initializing the set of register values in each worker machine of the set of worker machines.

3. The method of claim 1, further comprising:
transmitting the optimized set of register values and the server ISA vector to the set of worker machines, the transmitting causing:
computing, using the processor and the memory of the first worker machine, a server gradient vector, the server gradient vector comprising a set of approximate gradients corresponding to the set of nodes, the set of approximate gradients including the x-th approximate gradient; and
adding, using the processor and the memory of the first worker machine, the x-th approximate gradient to a previous x-th weight of an x-th node in the set of nodes of the first neural network instance at the first worker machine, the previous x-th weight being included in the set of weights, the adding being a part of the updating the set of weights, the adding forming an updated set of weights.

4. The method of claim 1, wherein updating the set of weights completes one iteration of distributed training of the first neural network instance and forms an iteration-trained first neural network instance, further comprising:
transmitting the optimized set of register values and the server ISA vector to the set of worker machines, the transmitting causing:
subjecting the iteration-trained first neural network instance to a new training input;
computing a y-th gradient corresponding to a y-th weight of a y-th node of the iteration-trained first neural network instance;
constructing a y-th ISA instruction in a new first ISA vector, the y-th ISA instruction comprising an opcode from the set of opcodes and an optimized register value from the set of optimized register values; and
transmitting the new first ISA vector to the parameter server.

5. The method of claim 1, further comprising:
forming, as a part of constructing the server ISA vector, the server ISA instruction by combining an opcode from the set of opcodes and an optimized register value from the set of optimized register values.

6. The method of claim 1, further comprising:
computing, using the processor and the memory of the parameter server, a server gradient vector, the server gradient vector comprising a set of approximate gradients, the set of approximate gradients including the x-th approximate gradient; and
adding, using the processor and the memory of the parameter server, the x-th approximate gradient to a previous x-th weight used by each x-th node in each set of nodes of each neural network instance in the set of worker machines, the adding forming an updated set of weights.

7. The method of claim 1, wherein the server ISA instruction comprises:
a first number of bytes that is less than a second number of bytes needed to represent the gradient in the first set of gradients,
wherein a set of bits corresponding to the first number of bytes is divided into a first subset of bits and a second subset of bits,
wherein the first subset of bits representing an opcode from the set of opcodes, and
wherein the second subset of bits representing an index into a bank of registers, the bank of registers holding the set of optimized register values.

8. The method of claim 7, wherein the set of opcodes includes as many opcodes as can be represented by the first subset of bits, and wherein the set of opcodes is a selected subset of a second set of opcodes.

9. The method of claim 7, wherein the bank of registers includes as many registers as can be represented by the second subset of bits, and wherein the bank of registers is a selected subset of a second bank of registers.

10. The method of claim 1, further comprising:
concluding training the neural network instances responsive to determining that an n-th iteration overall gradient vector includes at least a threshold number of gradients that are within a specified tolerance of corresponding gradients in an (n−1)-th iteration gradient.

11. A computer usable program product comprising one or more computer-readable storage devices, and program instructions stored on at least one of the one or more storage devices, the stored program instructions comprising:
program instructions to compute, using a processor and a memory at a parameter server, an overall gradient vector from a set of instruction set architecture (ISA) vectors corresponding to a set of worker machines, a first ISA vector of a first worker machine comprising a first set of ISA instructions corresponding to a first set of gradients, each gradient in the first set of gradients corresponding to a weight of a node of a first neural network instance being distributedly trained in the first worker machine;
program instructions to optimize a set of register values such that when an optimized register value in the set of optimized register values is used in an approximation computation with an opcode from a set of opcodes the approximation computation produces an x-th approximate gradient that is within a tolerance value of an actual value of an x-th gradient in the overall gradient vector;
program instructions to construct a server ISA vector, wherein in the server ISA vector, a server ISA instruction in an x-th position in the server ISA vector corresponds to the x-th gradient in the overall gradient vector; and
program instructions to cause a processor and a memory at the first worker machine to update a set of weights of a set of nodes of the first neural network instance being distributedly trained in the first worker machine, the set of weights being updated using the set of optimized register values and the server ISA vector.

12. The computer usable program product of claim 11, further comprising:
program instructions to configure, before initiating a first iteration of training a distributed set of neural network instances, the set of opcodes in each worker machine of the set of worker machines, wherein each worker machine in the set of worker machines trains one neural network instance from the set of distributed neural network instances, each neural network instance in the set of distributed neural network instances being identical, and wherein different neural network instances in different worker machines are subjected to different training inputs; and
program instructions to initialize the set of register values in each worker machine of the set of worker machines.

13. The computer usable program product of claim 11, further comprising:
program instructions to transmit the optimized set of register values and the server ISA vector to the set of worker machines, the transmitting causing:
program instructions to compute, using the processor and the memory of the first worker machine, a server gradient vector, the server gradient vector comprising a set of approximate gradients corresponding to the set of nodes, the set of approximate gradients including the x-th approximate gradient; and
program instructions to add, using the processor and the memory of the first worker machine, the x-th approximate gradient to a previous x-th weight of an x-th node in the set of nodes of the first neural network instance at the first worker machine, the previous x-th weight being included in the set of weights, the adding being a part of the updating the set of weights, the adding forming an updated set of weights.

14. The computer usable program product of claim 11, wherein updating the set of weights completes one iteration of distributed training of the first neural network instance and forms an iteration-trained first neural network instance, further comprising:
program instructions to transmit the optimized set of register values and the server ISA vector to the set of worker machines, the transmitting causing:
program instructions to subject the iteration-trained first neural network instance to a new training input;
program instructions to compute a y-th gradient corresponding to a y-th weight of a y-th node of the iteration-trained first neural network instance;
program instructions to construct a y-th ISA instruction in a new first ISA vector, the y-th ISA instruction comprising an opcode from the set of opcodes and an optimized register value from the set of optimized register values; and
program instructions to transmit the new first ISA vector to the parameter server.

15. The computer usable program product of claim 11, further comprising:
program instructions to form, as a part of constructing the server ISA vector, the server ISA instruction by combining an opcode from the set of opcodes and an optimized register value from the set of optimized register values.

16. The computer usable program product of claim 11, further comprising:
program instructions to compute, using the processor and the memory of the parameter server, a server gradient vector, the server gradient vector comprising a set of approximate gradients, the set of approximate gradients including the x-th approximate gradient; and
program instructions to add, using the processor and the memory of the parameter server, the x-th approximate gradient to a previous x-th weight used by each x-th node in each set of nodes of each neural network instance in the set of worker machines, the adding forming an updated set of weights.

17. The computer usable program product of claim 11, wherein the server ISA instruction comprises:
a first number of bytes that is less than a second number of bytes needed to represent the gradient in the first set of gradients,
wherein a set of bits corresponding to the first number of bytes is divided into a first subset of bits and a second subset of bits,
wherein the first subset of bits representing an opcode from the set of opcodes, and wherein the second subset of bits representing an index into a bank of registers, the bank of registers holding the set of optimized register values.

18. The computer usable program product of claim 11, wherein the computer usable code is stored in a computer readable storage device in a data processing system, and wherein the computer usable code is transferred over a network from a remote data processing system.

19. The computer usable program product of claim 11, wherein the computer usable code is stored in a computer readable storage device in a server data processing system, and wherein the computer usable code is downloaded over a network to a remote data processing system for use in a computer readable storage device associated with the remote data processing system.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to compute, using a processor and a memory at a parameter server, an overall gradient vector from a set of instruction set architecture (ISA) vectors corresponding to a set of worker machines, a first ISA vector of a first worker machine comprising a first set of ISA instructions corresponding to a first set of gradients, each gradient in the first set of gradients corresponding to a weight of a node of a first neural network instance being distributedly trained in the first worker machine;

program instructions to optimize a set of register values such that when an optimized register value in the set of optimized register values is used in an approximation computation with an opcode from a set of opcodes the approximation computation produces an x-th approximate gradient that is within a tolerance value of an actual value of an x-th gradient in the overall gradient vector;

program instructions to construct a server ISA vector, wherein in the server ISA vector, a server ISA instruction in an x-th position in the server ISA vector corresponds to the x-th gradient in the overall gradient vector; and program instructions to cause a processor and a memory at the first worker machine to update a set of weights of a set of nodes of the first neural network instance being distributedly trained in the first worker machine, the set of weights being updated using the set of optimized register values and the server ISA vector.

* * * * *